US012706983B2

(12) United States Patent
Tsukagoshi

(10) Patent No.: US 12,706,983 B2
(45) Date of Patent: Aug. 11, 2026

(54) TRANSMISSION DEVICE, TRANSMISSION METHOD, RECEPTION DEVICE, AND A RECEPTION METHOD

(71) Applicant: SONY GROUP CORPORATION, Tokyo (JP)

(72) Inventor: Ikuo Tsukagoshi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 52 days.

(21) Appl. No.: 18/972,173

(22) Filed: Dec. 6, 2024

(65) Prior Publication Data

US 2025/0106304 A1 Mar. 27, 2025

Related U.S. Application Data

(63) Continuation of application No. 17/979,517, filed on Nov. 2, 2022, now Pat. No. 12,166,838, which is a (Continued)

(30) Foreign Application Priority Data

Sep. 12, 2014 (JP) ................................ 2014-186155

(51) Int. Cl.
*H04L 67/561* (2022.01)
*G10L 19/16* (2013.01)
(Continued)

(52) U.S. Cl.
CPC ............ *H04L 67/561* (2022.05); *H04L 65/65* (2022.05); *H04L 65/762* (2022.05);
(Continued)

(58) Field of Classification Search
CPC ..... H04L 67/561; H04L 65/65; H04L 65/762; H04L 65/612; H04L 65/70; H04L 65/765;
(Continued)

(56) References Cited

U.S. PATENT DOCUMENTS 7,941,553 B2 5/2011 Baumeister
10,547,701 B2 1/2020 Tsukagoshi
(Continued)

FOREIGN PATENT DOCUMENTS

CN 101650961 A 2/2010
DE 202013001075 U1 6/2013
(Continued)

OTHER PUBLICATIONS

Qualcomm Incorporated, "Pseudo CR: Adaptive HTTP Streaming—Full Solution Proposal", Jan. 25-29, 2010, 3GPP TSG—SA4 #57, pp. 1-17 (Year: 2010).
(Continued)

*Primary Examiner* — Jonathan A Bui
(74) *Attorney, Agent, or Firm* — Oblon, McClelland, Maier & Neustadt, L.L.P.

(57) ABSTRACT

It is possible to enable a reception side to easily recognize that metadata is inserted into an audio stream. A metafile including meta information for acquiring an audio stream into which metadata is inserted through a reception device is transmitted. The identification information indicating that the metadata is inserted into the audio stream is inserted into the metafile. At the reception side, it is possible to easily recognize that the metadata is inserted into the audio stream based on the identification information inserted into the metafile.

16 Claims, 38 Drawing Sheets

Related U.S. Application Data continuation of application No. 17/335,740, filed on Jun. 1, 2021, now Pat. No. 11,509,737, which is a continuation of application No. 16/707,876, filed on Dec. 9, 2019, now Pat. No. 11,025,737, which is a continuation of application No. 15/026,018, filed as application No. PCT/JP2015/075313 on Sep. 7, 2015, now Pat. No. 10,547,701.

(51) Int. Cl.

| | |
|---|---|
| ***H04L 65/65*** | (2022.01) |
| ***H04L 65/75*** | (2022.01) |
| ***H04N 21/235*** | (2011.01) |
| ***H04N 21/435*** | (2011.01) |
| ***H04N 21/81*** | (2011.01) |
| ***H04N 21/845*** | (2011.01) |
| ***H04N 21/854*** | (2011.01) |
| ***H04N 21/858*** | (2011.01) |

(52) U.S. Cl.

CPC .......... *G10L 19/167* (2013.01); *H04N 21/235* (2013.01); *H04N 21/435* (2013.01); *H04N 21/8113* (2013.01); *H04N 21/8456* (2013.01); *H04N 21/85406* (2013.01); *H04N 21/8586* (2013.01)

(58) Field of Classification Search

CPC ..... G10L 19/167; G10L 19/00; H04N 21/235; H04N 21/435; H04N 21/8113; H04N 21/8456; H04N 21/85406; H04N 21/8586; H04N 21/23614; H04N 21/4348; G06F 13/00

See application file for complete search history.

(56) References Cited

U.S. PATENT DOCUMENTS

| | | | | |
|---|---|---|---|---|
| 11,025,737 | B2 | 6/2021 | Tsukagoshi | |
| 2005/0099994 | A1* | 5/2005 | Kato | H04N 21/44209 370/352 |
| 2006/0047523 | A1 | 3/2006 | Ojanpera | |
| 2009/0307258 | A1 | 12/2009 | Priyadarshi | |
| 2010/0114983 | A1 | 5/2010 | Robert | |
| 2010/0141842 | A1* | 6/2010 | Shin | H04N 21/435 348/570 |
| 2010/0162295 | A1* | 6/2010 | Shin | H04N 5/60 725/151 |
| 2010/0215343 | A1* | 8/2010 | Ikeda | H04N 9/7921 348/54 |
| 2011/0090305 | A1* | 4/2011 | Ikeda | G11B 20/00115 348/E13.001 |
| 2011/0149024 | A1 | 6/2011 | Tsukagoshi | |
| 2012/0042247 | A1 | 2/2012 | Harper | |
| 2012/0102042 | A1 | 4/2012 | Flick | |
| 2013/0081095 | A1 | 3/2013 | Kitazato | |
| 2013/0111530 | A1 | 5/2013 | Kitazato | |
| 2013/0223539 | A1* | 8/2013 | Lee | H04L 65/70 709/224 |
| 2014/0053220 | A1 | 2/2014 | Tsukagoshi | |
| 2014/0053224 | A1 | 2/2014 | Tsukagoshi | |
| 2014/0147088 | A1* | 5/2014 | Kawaguchi | H04N 21/4622 386/201 |
| 2014/0189772 | A1 | 7/2014 | Yamagishi | |
| 2015/0026242 | A1 | 1/2015 | Lim | |
| 2015/0195328 | A1 | 7/2015 | Rehan | |
| 2015/0271237 | A1 | 9/2015 | Stockhammer | |
| 2016/0196830 | A1 | 7/2016 | Riedmiller | |
| 2016/0204887 | A1 | 7/2016 | Lee | |
| 2016/0241890 | A1 | 8/2016 | Park et al. | |
| 2016/0358096 | A1 | 12/2016 | Bannur | |
| 2016/0381399 | A1* | 12/2016 | Brondijk | H04N 21/8106 725/116 |
| 2017/0019432 | A1 | 1/2017 | Oh | |
| 2017/0339459 | A1 | 11/2017 | Kim | |
| 2020/0413109 | A1 | 12/2020 | Yamaghishi | |

FOREIGN PATENT DOCUMENTS

| | | | |
|---|---|---|---|
| EP | 2 584 784 | A1 | 4/2013 |
| EP | 3193330 | A1 | 7/2017 |
| JP | 2007150764 | A | 6/2007 |
| JP | 2012/10311 | A | 1/2012 |
| JP | 2013502183 | A | 1/2013 |
| JP | 2014017741 | A | 1/2014 |
| JP | 2014522155 | A | 8/2014 |
| JP | 6809221-82 | | 1/2021 |
| JP | 2020204046 | | 4/2021 |
| JP | 7099510-82 | | 7/2022 |
| JP | 2024009245 | | 1/2024 |
| JP | 2024050685 | A | 4/2024 |
| KR | 20120097313 | A | 9/2012 |
| KR | 20130108080 | A | 10/2013 |
| WO | WO-2012133064 | A1 | 10/2012 |
| WO | 2013/065566 | A1 | 5/2013 |
| WO | WO-2013152326 | A1 | 10/2013 |
| WO | WO-2014014757 | A1 | 1/2014 |
| WO | WO-2014041067 | A1 | 3/2014 |
| WO | 2014/109321 | A1 | 7/2014 |
| WO | WO-2014124268 | A1 | 8/2014 |
| WO | WO-2014134472 | A2 | 9/2014 |
| WO | WO-2016039285 | A1 | 3/2016 |

OTHER PUBLICATIONS

Combined Chinese Office Action and Search Report issued Mar. 4, 2020 in corresponding Chinese Patent Application No. 201580002513.9 (with English Translation), 19 pages.

Office Action issued Oct. 3, 2019 in Japanese Patent Application No. 2016-514783.

Extended European Search Report issued Mar. 8, 2018 in Patent Application No. 15840109.1, 11 pages.

Qualcomm Incorporated, "Removal of Progressive Download and HTTP Streaming", 3GPP TSG-SA4 #60, S4-1005 78, Aug. 16-20, 2010, Erlangen, Germany.

International Search Report Issued Nov. 2, 2015 in PCT/JP15/075313 Filed Sep. 7, 2015.

Dolby Laboratories Licensing Corporating, "Audio Encoder And Decoder With Loudness Processing State Metadata", Apr. 30, 2013, DE 202013001075 U1 (English Translation), pp. 1-54 (Year: 2013).

International Organization for Standardization, "Information Technology—Coding of Audio-Visual Objects—Part 3: Audio", International Standard ISO/IEC 14496-3:2005(E), 2005, ISO/IEC, pp. 1-120.

ISO/IEC, "Information Technology-High Efficiency Coding and Media Delivery in Heterogeneous Environments—Part 3: 3D Audio", 201404-4, ISO/IEC JTC/SC 29 N, ISO/IEC CD 23008-3, ISO/IEC JTC 1/SC 29/WG 11, 2014, XP030021195.

* cited by examiner

FIG. 4

MPD FILE DESCRIPTION EXAMPLE

```
<MPD>
  <Period>
        <AdaptationSet mimeType=“audio/mp4” group=“1”>
                <SupplementaryDescriptor schemeIdUri=“urn:brdcst:codecType” value= “mpegh”/>
                <SupplementaryDescriptor schemeIdUri=“urn:brdcst:coordinatedControl” value=“true”/>
                <SupplementaryDescriptor schemeIdUri=“urn:brdcst:AudioMetaContained” value=“true”/>
                <SupplementaryDescriptor schemeIdUri=“urn:brdcst:netlink:metaInsertionFrequency” value=“1”/>
                <SupplementaryDescriptor schemeIdUri=“urn:brdcst:type” value=“netlink”/>
                <Representation id=“11” bandwidth=“128000”>
                        <baseURL>audio/jp/128.mp4</BaseURL>
                </Representation>
        </AdaptationSet>
        <AdaptationSet mimeType=“video/mp4” group=“2”>
                <SupplementaryDescriptor schemeIdUri=“urn:brdcst:codecType” value= “hevc”/>
                <SupplementaryDescriptor schemeIdUri=“urn:brdcst:coordinatedControl” value=“true”/>
                <SupplementaryDescriptor schemeIdUri=“urn:brdcst:VideoMetaContained” value=“true”/>
                <SupplementaryDescriptor schemeIdUri=“urn:brdcst:metaInsertionFrequency” value=“1”/>
                <SupplementaryDescriptor schemeIdUri=“urn:brdcst:type” value=“netlink”/>
                <Representation id=“21” bandwidth=“20000000”>
                        <baseURL>video/jp/20000000.mp4</BaseURL>
                </Representation>
        </AdaptationSet>
  </Period>
</MPD>
```

FIG. 5 schemeIdUri IS DEFINED BY SupplementaryDescriptor AS FOLLOW.

schemeIdUri="urn:brdcst:codecType" INDICATES TYPE OF CODEC.
value: DESCRIBED AS "mpegh," "AAC," "AC3," "AC4"

schemeIdUri="urn:brdcst:coordinatedControl" INDICATES THAT INFORMATION NECESSARY FOR NETWORK CONNECTION IS SUPPLIED THROUGH COORDINATION OF PLURALITY OF MEDIA STREAMS.
value: "true" NETWORK CONNECTION INFORMATION IS SUPPLIED IN COORDINATION WITH STREAM OF OTHER Adaptation Set. (FOR EXAMPLE, NETWORK CONNECTION INFORMATION IS SUPPLIED THROUGH BOTH audio stream AND video stream)
value: "false" NETWORK CONNECTION INFORMATION IS SUPPLIED ONLY THROUGH STREAM OF PRESENT Adaptation Set.

schemeIdUri="urn:brdcst:audioMetaContained" INDICATES THAT AUDIO META INFORMATION IS INCLUDED.
value: "true" AUDIO META INFORMATION IS INCLUDED.
value: "false" AUDIO META INFORMATION IS NOT INCLUDED.

schemeIdUri="urn:brdcst:metaInsertionFrequency INDICATES FREQUENCY AT WHICH META INFORMATION IS SUPPLIED IN UNITS OF ACCESS UNITS.
value: "1" ONE USER DATA entry IS GENERATED IN ONE ACCESS UNIT.
value: "2" PLURALITY OF USER DATA entries ARE GENERATED IN ONE ACCESS UNIT.
value: "3" ONE OR MORE USER DATA entries ARE GENERATED DURING PERIOD OF TIME DELIMITED BY RANDOM ACCESS POINT.

schemeIdUri="urn:brdcst:videoMetaContained" INDICATES THAT VIDEO META INFORMATION IS INCLUDED.
value: "true" VIDEO META INFORMATION IS INCLUDED.
value: "false" VIDEO META INFORMATION IS NOT INCLUDED.
schemeIdUri="urn:brdcst:type" INDICATES TYPE OF SERVICE BY META.
value: "netlink" TYPE OF SERVICE BY META IS NETWORK CONNECTION.

Audio Frame STRUCTURE OF AAC

FIG. 10

Syntax of data_stream_element

| Syntax | No.of bits | Mnemonic |
| --- | --- | --- |
| data_stream_element () | | |
| { | | |
| element_instance_tag; | 4 | uimsbf |
| data_byte_align_flag; | 1 | uimsbf |
| cnt=count | 8 | uimsbf |
| if (cn t==255) { | | |
| Cnt + = esc_count; | 8 | uimsbf |
| } | | |
| if (data_byte_align_flg) { | | |
| byte_alignment (); | | |
| } | | |
| for (l = 0, i<cnt, i++) { | | |
| data_stream_byte [element_instance_tag] [i]; | 8 | uimsbf |
| } | | |
| } | | |

| Syntax | No. of Bits | Format |
|---|---|---|
| metadata (){ | | |
| userdata_identifier | 32 | uimsbf |
| if (userdata_identifier == "AAAA" ) { | | |
| metadata_type | 8 | uimsbf |
| if (metadata_type == "0x08") { | | |
| SDO_payload() | | |
| }else{ | | |
| reserved | | |
| } | | |
| } | | |
| } | | |

FIG. 11a userdata_identifier (32bits) Shall be set to the value of predefined sequence for audio_userdata.

metadata_type (8bits) Describes type of metadata.

'0x08' Unconditioned character to describe URL access, which specifies to contain ATSC SDO_payload().

Syntax of SDO_payload()

| Syntax | No. of Bits | Format |
|---|---|---|
| SDO_payload() { | | |
| if (cmdID<0x05) { | | |
| for (k=0; k<L-1; k++) { | | |
| URI_character | 8 | uimsbf |
| } | | |
| } else { | | |
| reserved | var | |
| } | | |
| } | | |

Syntax/semantics of SDO_payload is compliant to ATSC A/105 Candidate Standard.

FIG. 13

| cmdID value | Meaning |
|---|---|
| 0x00 | Interactive services Trigger – TDO model |
| 0x01 | Interactive services Trigger – Direct Execution model |
| 0x02 | Location of PDI Table |
| 0x03 | Location of Usage Reporting Data Server |
| 0x04 | Base URL for Internet delivery of signaling and announcements |
| 0x05-0x1F | Reserved for future ATSC use |

AC3 Synchronization Frame

FIG. 15
STRUCTURE OF AUXILIARY DATA OF AC3
| Syntax | Word Size |
|---|---|
| auxdata() | |
| { | |
|     **auxbits** | **nauxbits** |
|     if(auxdatae) | |
|     { | |
|         **auxdatal** | **14** |
|     } | |
|     **auxdatae** | **1** |
| } | |
| /* end of auxdata */ | |
FIG. 16a
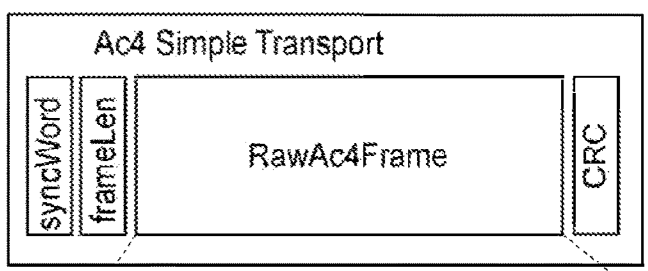
FIG. 16b
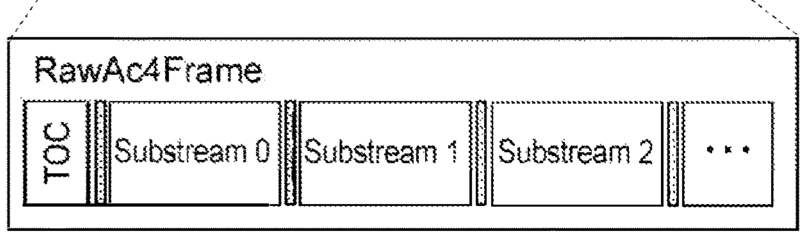

FIG. 17a
FIG. 17b
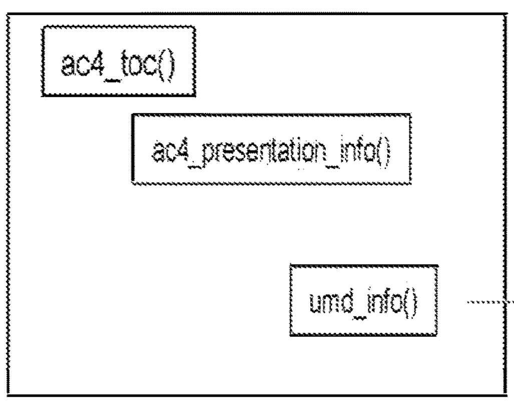
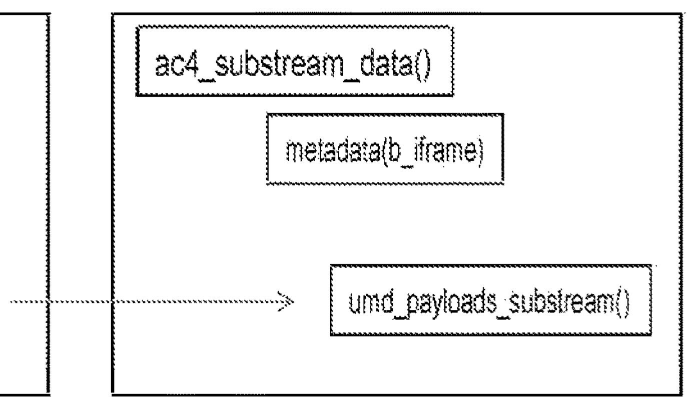

FIG. 18

Syntax of umd_info()

| Syntax | No. of bits | Mnemonic |
|---|---|---|
| umd_info(){ | | |
| umd_version | 2 | uimsbf |
| k_id | | |
| substream_index | 2(+2) | uimsbf |
| ⋮ | | |
| } | | |

Substream_index INDEX VALUE

FIG. 19

| Syntax | No. of Bits | Format |
|---|---|---|
| umd_payload_substream() { | | |
| umd_payload_id | 5 | uimsbf |
| umd_userdata_identifier | 32 | uimsbf |
| umd_payload_size | 16 | uimsbf |
| if (umd_userdata_identifier == "AAAA" ) { | | |
| umd_metadata_type | 8 | uimsbf |
| if (umd_metadata_type == "0x08") { | | |
| SDO_payload() | | |
| }else{ | | |
| reserved | | |
| } | | |
| } | | |
| } | | |

umd_userdata_identifier (32bits) Shall be set to the value of predefined sequence for audio userdata.

umd_payload_size (16bts) Describes the total number of bytes following this element.

umd_metadata_type (8bits) Describes type of metadata.
'0x08' Unconditioned character to describe URL access, which specifies to contain ATSC SDO_payload().

FIG. 22

| usacExtElementType | Value |
| --- | --- |
| ID_EXT_ELE_FILL | 0 |
| ID_EXT_ELE_MPEGS | 1 |
| ID_EXT_ELE_SAOC | 2 |
| ID_EXT_ELE_AUDIOPREROLL | 3 |
| ID_EXT_ELE_UNI_DRC | 4 |
| ID_EXT_ELE_OBJ_METADATA | 5 |
| ID_EXT_ELE_SAOC_3D | 6 |
| ID_EXT_ELE_HOA | 7 |
| /* reserved for ISO use */ | 8-127 |
| /* reserved for use outside of ISO scope */ | 128 and higher |
| ID_EXT_ELE_userdata | 128 |

Syntax of userdataConfig()

| Syntax | No. of bits | Mnemonic |
|---|---|---|
| userdataConfig() | | |
| { | | |
| userdata_identifier | 32 | uimsbf |
| userdata_frameLength | 16 | uimsbf |
| } | | |

FIG. 23a

| | |
|---|---|
| userdata_identifier (32bits) | Shall be set to the value of predefined sequence for audio userdata. |
| userdata_frameLength (16bts) | Describes the total number of bytes in audio_userdata(). |

Syntax of audio_userdata()

| Syntax | No. of bits | Mnemonic |
|---|---|---|
| audio_userdata() | | |
| { | | |
|     if (userdata_identifier == "AAAA" ) { | | |
|         metadataType | 8 | uimsbf |
|         if (metadataType == "0x08") { | | |
|             SDO_payload() | | |
|         }else{ | | |
|             reserved | | |
|         } | | |
|     } | | |
| } | | |

metadataType (8bits) Describes type of metadata.

'0x08' Unconditioned character to describe URL access, which specifies to contain ATSC SDO_payload().

STRUCTURE EXAMPLE OF Audio InfoFrame packet

| Byte# | 7 | 6 | 5 | 4 | 3 | 2 | 1 | 0 |
|---|---|---|---|---|---|---|---|---|
| 0 | Packet Type = 0x84 | | | | | | | |
| 1 | Version | | | | | | | |
| 2 | 0 | | | Length = 0x0A | | | | |
| 3 | Checksum | | | | | | | |
| 4 | CT3 | CT2 | CT1 | CT0 | Rsvd(0) | CC2 | CC1 | CC0 |
| 5 | Reserved (0) | | Userdata_presence_flg | SF2 | SF1 | SF0 | SS1 | SS0 |
| 6 | Format depends on coding type | | | | | | | |
| 7 | CA7 | CA6 | CA5 | CA4 | CA3 | CA2 | CA1 | CA0 |
| 8 | DM_INH | LSV3 | LSV2 | LSV1 | LSV0 | Rsvd (0) | LFEPBL1 | LFEPBL0 |
| 9 | metadata_type | | | coordinated_control_flag | Rsvd (0) | frequency_type | | |
| 10 | Reserved (0) | | | | | | | |
| 11 | Reserved (0) | | | | | | | |
| 12 | Reserved (0) | | | | | | | |
| 13 | Reserved (0) | | | | | | | |
| 14…30 | NA Reserved (0) | | | | | | | |

300 audio_userdata_descriptor

| Syntax | No. of Bits | Format |
|---|---|---|
| audio_userdata_descriptor(){ | | |
| descriptor_tag | 8 | uimsbf |
| descriptor_length | 8 | uimsbf |
| audio_codec_type | 8 | uimsbf |
| metadata_type | 3 | uimsbf |
| coordinated_control_flag | 1 | bslbf |
| reserved | 1 | |
| frequency_type | 3 | uimsbf |
| } | | |

FIG. 37

Semantics of descriptor audio_codec_type (8bits) describes the type of audio codec.

| | |
|---|---|
| 0x1 | MPEGH |
| 0x2 | AAC |
| 0x3 | AC3 |
| 0x4 | AC4 |
| others | reserved |

metadata_type (3bits) describes the type of information carried in userdata.

| | |
|---|---|
| 0x1 | Unconditioned character to describe URL access, which specifies to contain ATSC SDO_payload(). |
| others | reserved |

coordinated_control_flag (1bit) describes whether the information for control is carried in multiple components.

| | |
|---|---|
| '1' | the control information is provided by the other component stream as well. (such as video stream) |
| '0' | the control information is provided by audio stream only. |

frequency_type (3bits) describes the frequency of userdata insertion among the access units.

| | |
|---|---|
| 0x1 | exactly one userdata is inserted every audio access unit |
| 0x2 | more than one userdata is inserted in an audio access unit |
| 0x3 | at least one userdata is inserted at the top of every random access point |
| others | reserved |

200A

300A

TRANSMISSION DEVICE, TRANSMISSION METHOD, RECEPTION DEVICE, AND A RECEPTION METHOD

CROSS-REFERENCE TO RELATED APPLICATIONS

This application is a continuation of U.S. Ser. No. 17/979,517, filed Nov. 2, 2022, which is a continuation of U.S. Ser. No. 17/335,740 (now U.S. Pat. No. 11,509,737), filed Jun. 1, 2021, which is a continuation of U.S. Ser. No. 16/707,876 (now U.S. Pat. No. 11,025,737) filed Dec. 9, 2019, which is a continuation of U.S. Ser. No. 15/026,018 (now U.S. Pat. No. 10,547,701) filed Mar. 30, 2016, the entire contents of which are incorporated herein by reference. U.S. Ser. No. 15/026,018 is a national stage of PCT/JP2015/075313 filed Sep. 7, 2015, and also claims priority under 35 U.S.C. 119 to Japanese Application No. 2014-186155 filed Sep. 12, 2014.

BACKGROUND OF THE INVENTION

Field of the Invention

The present technology relates to a transmission device, a transmission method, a reception device, and a reception method, and more particularly, to a transmission device related to a technique of inserting metadata into an audio stream and transmitting the resulting audio stream, and the like.

Description of the Related Art

In the past, a technique of inserting metadata into an audio stream and transmitting the resulting audio stream was proposed (for example, see Patent Document 1).

CITATION LIST

Patent Document

Patent Document 1: Japanese Patent Application Laid-Open No. 2012-010311

SUMMARY OF THE INVENTION

Problems to be Solved by the Invention

Metadata is defined in a user data region of an audio stream, for example. However, metadata is not necessarily inserted into all audio streams.

It is an object of the present technology to enable a reception side to easily recognize that metadata is inserted into an audio stream and thus improve convenience of a process.

Solutions to Problems

A concept of the present technology lies in a transmission device, including:

- a transmitting unit that transmits a metafile including meta information for acquiring an audio stream into which metadata is inserted through a reception device; and
- an information inserting unit that inserts identification information indicating that the metadata is inserted into the audio stream into the metafile.

In the present technology, a transmitting unit transmits a metafile including meta information for acquiring an audio stream into which metadata is inserted through a reception device. For example, the metadata may be access information for a connection to a predetermined network service. In this case, for example, the metadata may be a character code indicating URI information.

For example, the transmitting unit may transmit the metafile via an RF transmission path or a communication network transmission path. Further, for example, the transmitting unit may further transmit a container of a predetermined format including the audio stream into which the metadata is inserted. In this case, for example, the container may be an MP4 (ISO/IEC 14496-14:2003).

An information inserting unit inserts identification information indicating that the metadata is inserted into the audio stream into the metafile. For example, the metafile may be a media presentation description (MPD) file. In this case, for example, the information inserting unit may insert the identification information into the metafile using a "Supplementary Descriptor."

As described above, in the present technology, the identification information indicating that the metadata is inserted into the audio stream is inserted into the metafile including the meta information for acquiring the audio stream into which the metadata is inserted in the reception device. Thus, at the reception side, it is possible to easily recognize that the metadata is inserted into the audio stream. Further, for example, it is also possible to perform the process of extracting the metadata inserted into the audio stream based on the recognition and acquire the metadata reliably without waste.

Further, another concept of the present technology lies in a reception device, including:

- a receiving unit that receives a metafile including meta information for acquiring an audio stream into which metadata is inserted, wherein identification information indicating that the metadata is inserted into the audio stream is inserted into the metafile; and
- a transmitting unit that transmits the audio stream to an external device via a predetermined transmission path together with the identification information indicating that the metadata is inserted into the audio stream.

In the present technology, a receiving unit receives a metafile including meta information for acquiring an audio stream into which metadata is inserted. For example, the metadata may be the access information for a connection to a predetermined network service. The identification information indicating that the metadata is inserted into the audio stream is inserted into the metafile.

For example, the metadata may be access information for a connection to a predetermined network service. For example, the metafile may be an MPD file, and the identification information may be inserted into the metafile using the "Supplementary Descriptor."

A transmitting unit transmits the audio stream to an external device via a predetermined transmission path together with the identification information indicating that the metadata is inserted into the audio stream. For example, the transmitting unit may transmit the audio stream and the identification information to the external device by inserting the audio stream and the identification information into a blanking period of time of image data and transmitting the image data to the external device. For example, the predetermined transmission path may be a high definition multimedia interface (HDMI) cable.

As described above, in the present technology, the audio stream into which the metadata is inserted is transmitted to the external device together with the identification information indicating that the metadata is inserted into the audio stream. Thus, at the external device side, it is possible to easily recognize that the metadata is inserted into the audio stream. Further, for example, it is also possible to perform the process of extracting the metadata inserted into the audio stream based on the recognition and acquire the metadata reliably without waste.

Another conception of the present technology lies in a reception device including a receiving unit that receives a metafile including meta information for acquiring an audio stream into which metadata is inserted, wherein identification information indicating that the metadata is inserted into the audio stream is inserted into the metafile, a metadata extracting unit that decodes the audio stream based on the identification information, and extracts the metadata, and a processing unit that performs a process using the metadata.

In the present technology, a receiving unit receives a metafile including meta information for acquiring an audio stream into which metadata is inserted. Identification information indicating that the metadata is inserted into the audio stream is inserted into the metafile. For example, the metafile may be an MPD file, and the identification information may be inserted into the metafile using a "Supplementary Descriptor."

A metadata extracting unit decodes the audio stream based on the identification information, and extracts the metadata. A processing unit performs a process using the metadata. For example, the metadata may be access information for a connection to a predetermined network service, and the processing unit may access the predetermined server on a network based on the network access information.

As described above, in the present technology, the metadata is extracted from the audio stream based on the identification information that is inserted into the metafile and indicates that the metadata is inserted into the audio stream and used for a process. Thus, it is possible to acquire the metadata inserted into the audio stream reliably without waste and execute the process using the metadata appropriately.

Further, another concept of the present technology lies in a transmission device, including:

- a stream generating unit that generates an audio stream into which metadata including network access information is inserted; and
- a transmitting unit that transmits a container of a predetermined format including the audio stream.

In the present technology, a stream generating unit generates an audio stream into which metadata including network access information is inserted. For example, the audio stream is generated by performing encoding such as AAC, AC3, AC4, or MPEGH (3D audio) on audio data, and the metadata is embedded in a user data region of the audio stream.

A transmitting unit transmits a container of a predetermined format including the audio stream. Here, a container of a predetermined format is, for example, an MP4, an MPEG2-TS, or the like. For example, the metadata may be a character code indicating URI information.

As described above, in the present technology, the metadata including the network access information is embedded in the audio stream and transmitted. Thus, for example, it is possible to simply transmit the network access information from a broadcasting station, a delivery server, or the like using the audio stream as a container so that the network access information is used at the reception side.

Effects of the Invention

According to the present technology, a reception side can easily recognize that metadata is inserted into an audio stream. The effect described herein is merely an example and not necessarily limited and may include any effect described in the present disclosure.

BRIEF DESCRIPTION OF THE DRAWINGS

FIG. 4 is a diagram illustrating an MPD file description example.

FIG. 5 is a diagram illustrating a definition example of "schemeIdUri" by "SupplementaryDescriptor."

FIG. 10 is a diagram illustrating a configuration of a "data stream element (DSE)" in which metadata MD is inserted when a compression format is AAC.

FIGS. 11(*a*) and 11(*b*) are diagrams illustrating a configuration of "metadata( )" and content of main information of the configuration.

FIG. 12 is a diagram illustrating a configuration of "SDO_payload( )."

FIG. 13 is a diagram illustrating a meaning of a value of a command ID (cmdID).

FIG. 15 is a diagram illustrating a configuration of auxiliary data of AC3.

FIGS. 16(*a*) and 16(*b*) are diagrams illustrating a structure of a simple transport layer of AC4.

FIGS. 17(*a*) and 17(*b*) are diagrams illustrating a schematic configuration of a TOC (ac4_toc( )) and a sub stream (ac4_substream_data( )).

FIG. 18 is a diagram illustrating a configuration of "umd_info( )" arranged in a TOC (ac4_toc ( )).

FIG. 19 is a diagram illustrating a configuration of "umd_payloads_substream( ))" arranged in a sub stream (ac4_substream_data( )).

FIG. 22 is a diagram illustrating a correspondence relation between a type (ExElementType) of an extension element (Ext_element) and a value (Value).

FIGS. 23(*a*) and 23(*b*) are diagrams illustrating a configuration of "userdataConfig( ))."

FIG. 24 is a diagram illustrating a configuration of "userdata ( ))."

FIG. 26 is a diagram illustrating an exemplary structure of an audio InfoFrame packet arranged in a data island period.

FIG. 37 is a diagram illustrating content of main information in an exemplary structure of an audio user data descriptor.

DETAILED DESCRIPTION OF THE PREFERRED EMBODIMENTS

Hereinafter, modes (hereinafter, referred to as "embodiments") for carrying out the invention will be described. A description will proceed in the following order.

1. Embodiments
2. Modified examples

1. EMBODIMENTS

[Overview of MPEG-DASH-Based Stream Delivery System]

First, an overview of an MPEG-DASH-based stream delivery system to which the present technology can be applied will be described.

Figure 1:
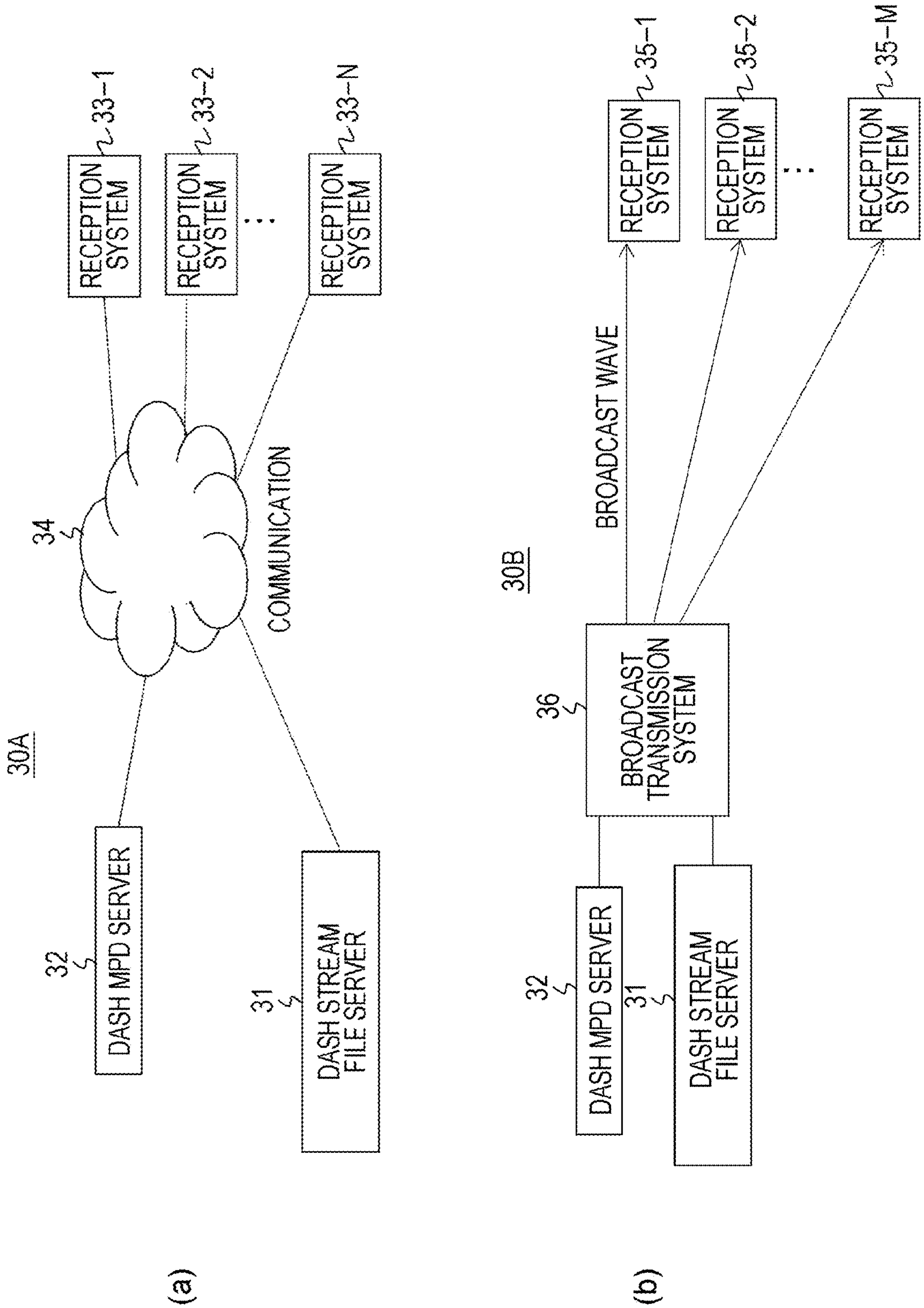
FIG. 1 is a block diagram illustrating exemplary configurations of an MPEG-DASH-based stream delivery system.

FIG. 1(*a*) illustrates an exemplary configuration of an MPEG-DASH-based stream delivery system 30A. In this exemplary configuration, a media stream and a media presentation description (MPD) file are transmitted via a communication network transmission path. The stream delivery system 30A is configured such that N reception systems 33-1, 33-2, . . . , and 33-N are connected to a DASH stream file server 31 and a DASH MPD server 32 via a content delivery network (CDN) 34.

The DASH stream file server 31 generates a stream segment (hereinafter, referred to appropriately as a "DASH segment") of a DASH specification based on media data (video data, audio data, subtitle data, or the like) of predetermined content, and transmits the segment according to a HTTP request made from the reception system. The DASH stream file server 31 may be a server dedicated for streaming and function as a web server as well.

The DASH stream file server 31 transmits a segment of a predetermined stream to a receiver of a request source via the CDN 34 according to a request of a segment of the stream transmitted from the reception system 33 (33-1, 33-2, . . . , and 33-N) via the CDN 34. In this case, the reception system 33 selects a stream of an optimal rate according to a state of a network environment in which a client is located with reference to a value of a rate described in the MPD file, and makes a request.

The DASH MPD server 32 is a server that generates the MPD file for acquiring the DASH segment generated in the DASH stream file server 31. The MPD file is generated based on content metadata received from a content management server (not illustrated) and an address (url) of the segment generated in the DASH stream file server 31. The DASH stream file server 31 and the DASH MPD server 32 may physically be the same.

In an MPD format, each attribute is described using an element such as a representation for each stream such as a video or an audio. For example, representations are divided for every a plurality of video data streams having different rates, and each rate thereof is described in the MPD file. The reception system 33 can select an optimal stream according to the state of the network environment in which the reception system 33 is located in view of the value of the rate as described above.

FIG. 1(*b*) illustrates an exemplary configuration of an MPEG-DASH-based stream delivery system 30B. In this exemplary configuration, the media stream and the MPD file are transmitted via an RF transmission path. The stream delivery system 30B is configured with a broadcast transmission system 36 connected with the DASH stream file server 31 and the DASH MPD server 32 and M reception systems 35-1, 35-2, . . . , and 35-M.

In the case of the stream delivery system 30B, the broadcast transmission system 36 transmits a stream segment (a DASH segment) of a DASH specification generated by the DASH stream file server 31 and an MPD file generated by the DASH MPD server 32 through a broadcast wave.

Figures 2A, 2B, 2C, 2D:
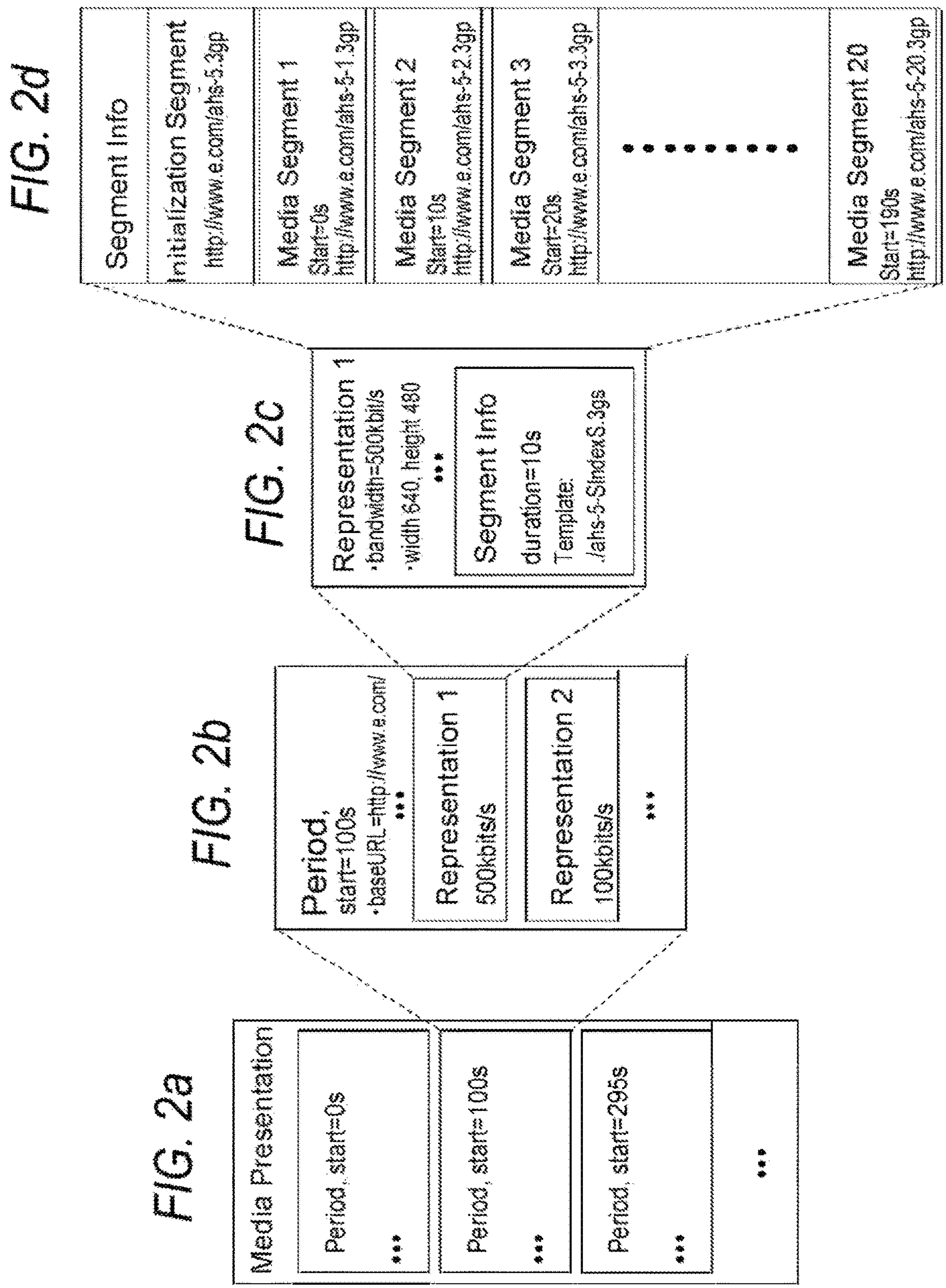
FIGS. 2(*a*) to 2(*d*) are diagrams illustrating an example of a relation of structures hierarchically arranged in an MPD file.

FIGS. 2(*a*) to 2(*d*) illustrate an example of a relation of structures hierarchically arranged in the MPD file. As illustrated in FIG. 2(*a*), a media presentation of the entire MPD file includes a plurality of periods delimited at time intervals. For example, a first period starts from a 0-th second, and a next period starts from a 100-th second.

As illustrated in FIG. 2(*b*), a period includes a plurality of representations. Among the plurality of representations, there is a group of representations related to media streams of the same substance having different stream attributes, for example, different rates which are grouped according to an adaptation set (AdaptationSet).

As illustrated in FIG. 2(*c*), the representation includes a segment info (SegmentInfo). The segment info includes an initialization segment and a plurality of media segments in which information of segments obtained by delimiting the period finer is described as illustrated in FIG. 2(*d*). The media segment includes, for example, information of an address (url) for actually acquiring segment data such as a video or an audio.

Further, stream switching can freely be performed among a plurality of representations grouped according to the adaptation set. Thus, it is possible to select a stream of an optimal rate according to a state of a network environment in which a reception system is located and perform seamless delivery.

[Configuration of Transceiving System]

FIGS. 3(*a*) and 3(*b*) illustrate an exemplary configuration of a transceiving system according to an embodiment. A transceiving system 10 of FIG. 3(*a*) includes a service transmission system 100, a set top box (STB) 200, and a television receiver (TV) 300. The set top box 200 is connected with the television receiver 300 via a high definition multimedia interface (HDMI) cable 400. "HDMI" is a registered trademark.

In the transceiving system 10, the service transmission system 100 corresponds to the DASH stream file server 31 and the DASH MPD server 32 of the stream delivery system 30A illustrated in FIG. 1(*a*). In the transceiving system 10, the service transmission system 100 corresponds to the DASH stream file server 31, the DASH MPD server 32, and the broadcast transmission system 36 of the stream delivery system 30B illustrated in FIG. 1(*b*).

In the transceiving system 10, the set top box (STB) 200 and the television receiver (TV) 300 correspond to the reception system 33 (33-1, 33-2, . . . , and 33-N) of the stream delivery system 30A illustrated in FIG. 1(*a*). In the transceiving system 10, the set top box (STB) 200 and the television receiver (TV) 300 correspond to the reception system 35 (35-1, 35-2, . . . , and 35-M) of the stream delivery system 30B illustrated in FIG. 1(*b*).

A transceiving system 10' of FIG. 3(*b*) includes a service transmission system 100 and a television receiver (TV) 300. In the transceiving system 10', the service transmission system 100 corresponds to the DASH stream file server 31 and the DASH MPD server 32 of the stream delivery system 30A illustrated in FIG. 1(*a*). In the transceiving system 10', the service transmission system 100 corresponds to the DASH stream file server 31, the DASH MPD server 32, and the broadcast transmission system 36 of the stream delivery system 30B illustrated in FIG. 1(*b*).

In the transceiving system 10', the television receiver (TV) 300 corresponds to the reception system 33 (33-1, 33-2, . . . , and 33-N) of the stream delivery system 30A illustrated in FIG. 1(*a*). In the transceiving system 10', the television receiver (TV) 300 corresponds to the reception system 35 (35-1, 35-2, . . . , and 35-M) of the stream delivery system 30B illustrated in FIG. 1(*b*).

The service transmission system 100 transmits a DASH/MP4, that is, an MPD file serving as a metafile and an MP4 including a media stream (a media segment) such as a video or an audio via the RF transmission path or the communication network transmission path. The service transmission system 100 inserts metadata into an audio stream. For example, access information for a connection to a predetermined network service, predetermined content information, or the like is considered as the metadata. In this embodiment, the access information for a connection to a predetermined network service is inserted.

The service transmission system 100 inserts identification information indicating that the metadata is inserted into the audio stream into the MPD file. The service transmission system 100 inserts the identification information indicating that the metadata is inserted into the audio stream, for example, using a "Supplementary Descriptor."

FIG. 4 illustrates a description example of the MPD file. A description of "<AdaptationSet mimeType="audio/mp4" group="1">" indicates that there is an adaptation set (AdaptationSet) for an audio stream, the audio stream is supplied with an MP4 file structure, and a group 1 is allocated.

A description of "<SupplementaryDescriptor schemeIdUri="urn:brdcst:AudioMetaContained" value="true"/>" indicates that the metadata is inserted into the audio stream. Based on "SupplementaryDescriptor," "schemeIdUri" can be newly defined as a broadcast or any other application, separately from an existing definition in an existing standard. As illustrated in FIG. 5, "schemeIdUri="urn:brdcst:AudiometaContained"" indicates that audio meta information is included, that is, that the metadata is inserted into the audio stream. For example, when a "value" is "true," it indicates that the audio meta information is included. When a "value" is "false," it indicates that the audio meta information is not included.

A description of "<SupplementaryDescriptor schemeIdUri="urn:brdcst:codecType" value="mpegh"/>" indicates that a codec of the audio stream is MPEGH (3D audio). As illustrated in FIG. 5, "schemeIdUri="urn:brdcst:codecType"" indicates a type of a codec. Examples of a "value" include "mpegh," "AAC," "AC3," and "AC4."

A description of "<SupplementaryDescriptor schemeIdUri="urn:brdcst:coordinatedControl" value="true"/>" indicates that information necessary for a network connection is emphasized among a plurality of media streams and supplied. As illustrated in FIG. 5, "schemeIdUri="urn:brdcst:coordinatedControl"" indicates that the information necessary for the network connection is supplied through a coordination of a plurality of media streams. For example, when a "value" is "true," it indicates that the network connection information is supplied in coordination with a stream of another adaptation set. When a "value" is "false," it indicates that the network connection information is supplied only through the stream of the present adaptation set.

A description of "<SupplementaryDescriptor schemeIdUri="urn:brdcst:type" value="netlink"/>" indicates that a type of a service by meta is a network connection. As illustrated in FIG. 5, "schemeIdUri="urn:brdcst:type"" indicates a type of a service by meta. For example, when a "value" is "netlink," it indicates that a type of a service by meta is a network connection.

A description of "<SupplementaryDescriptor schemeIdUri="urn:brdcst:metaInsertionFrequency" value="1"/>" indicates that meta information is supplied in units of access units. As illustrated in FIG. 5, "schemeIdUri="urn:brdcst:metaInsertionFrequency"" indicates a frequency in which the meta information is supplied in units of access units. For example, when a "value" is "1," it indicates that one user data entry is generated in one access unit. When a "value" is "2," it indicates that a plurality of user data entries are generated in one access unit. When a "value" is "3," it indicates that one or more user data entries are generated during a period of time delimited by a random access point.

Figures 6A, 6B, 6C, 6D:
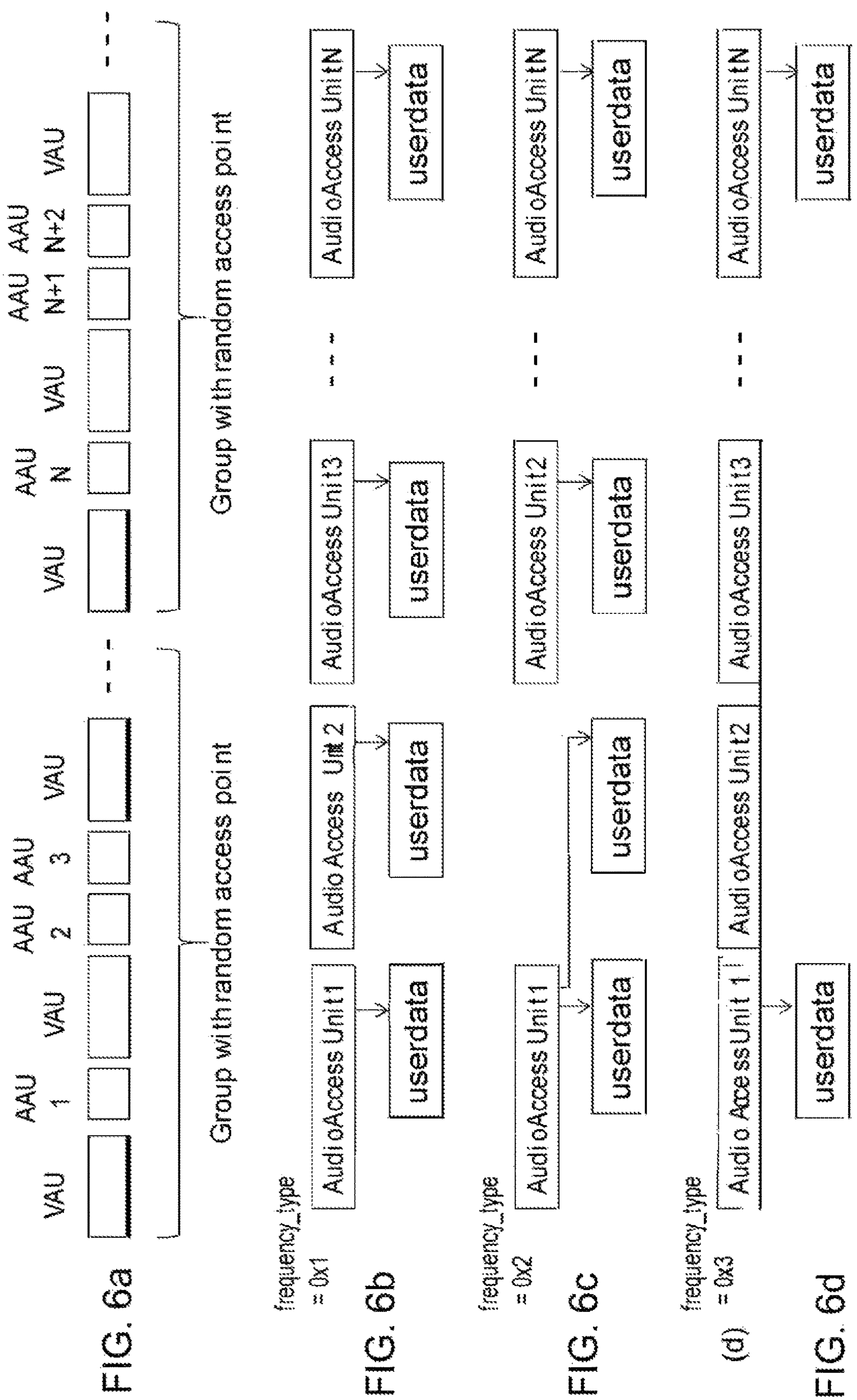
FIGS. 6(*a*) to 6(*d*) are diagrams for describing an arrangement example of video and audio access units in a transport stream and an insertion frequency of metadata into an audio stream.

FIG. 6(a) illustrates an arrangement example of video and audio access units contained in an MP4. "VAU" indicates a video access unit. "AAU" indicates an audio access unit. FIG. 6(b) illustrates that one user data entry (metadata) is inserted in each audio access unit when "frequency_type=1" is set.

FIG. 6(c) illustrates that a plurality of pieces of user data (metadata) are inserted in one audio access unit when "frequency_type=2" is set. FIG. 6(d) illustrates that at least one user data (metadata) is inserted into a first audio access unit for each group including a random access point when "frequency_type=3" is set.

Referring back to FIG. 4, a description of "<Representation id="11" bandwidth="128000">" indicates that "Representation id="11"" is set, and there is an audio stream in which the bit rate is 128 kbps. A description of "<baseURL>audio/jp/128.mp4</BaseURL>" indicates that a location destination of the audio stream is "audio/jp/128.mp4."

A description of "<AdaptationSet mimeType="video/mp4" group="2">" indicates that there is an adaptation set (AdaptationSet) for a video stream, the video stream is supplied with an MP4 file structure, and a group 2 is allocated.

A description of "<SupplementaryDescriptor schemeIdUri="urn:brdcst:VideoMetaContained" value="true"/> indicates that the metadata is inserted into the video stream. As illustrated in FIG. 5, "schemeIdUri="urn:brdcst:VideoMetaContained"" indicates that video meta information is included, that is, that the metadata is inserted into the video stream. For example, when a "value" is "true," it indicates that the video meta information is included. When a "value" is "false," it indicates that the video meta information is not included.

A description of "<SupplementaryDescriptor schemeIdUri="urn:brdcst:codecType" value="hevc"/>" indicates that a codec of the video stream is a HEVC. A description of "<SupplementaryDescriptor schemeIdUri="urn:brdcst:coordinatedControl" value="true"/>" indicates that the information necessary for the network connection is emphasized among a plurality of media streams and supplied.

A description of "<SupplementaryDescriptor schemeIdUri="urn:brdcst:type" value="netlink"/>" indicates that a type of a service by meta is a network connection. A description of "<SupplementaryDescriptor schemeIdUri="urn:brdcst:metaInsertionFrequency" value="1"/>" indicates that the meta information is supplied in units of access units.

A description of "<Representation id="21" bandwidth="20000000">" indicates that "Representation id="21"" is set, and there is a video stream in which the bit rate is 20 Mbps. A description of "<baseURL>video/jp/20000000.mp4</BaseURL>" indicates that a location destination of the video stream is "video/jp/20000000.mp4."

Figure 7A:
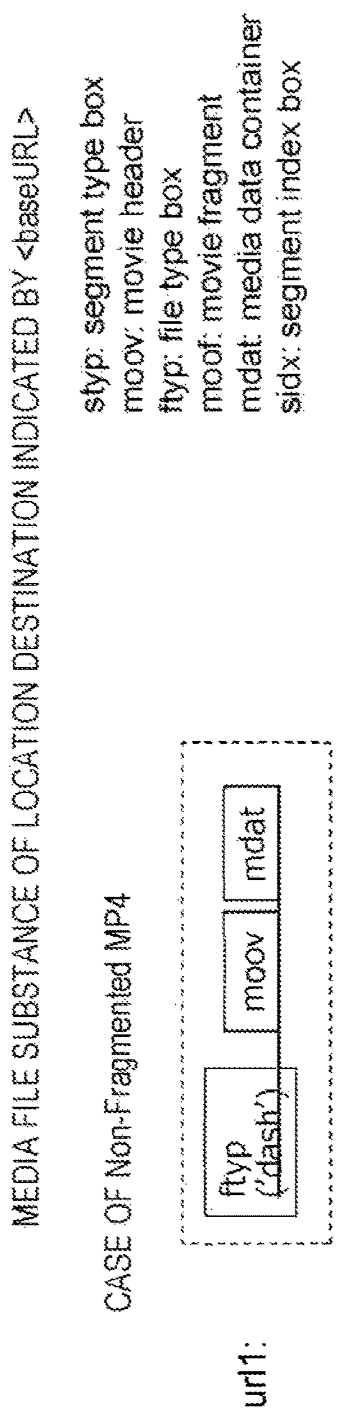
FIGS. 7(*a*) to 7(*c*) are diagrams for describing a media file substance of a location destination indicated by "<baseURL>."

Here, a media file substance of a location destination indicated by "<baseURL>" will be described. In the case of a non-fragmented MP4, there are cases in which "url 1" is defined as illustrated in FIG. 7(a), for example. In this case, a "ftyp" box describing a file type is first arranged. The "ftyp" box indicates that a file is a non-fragmented MP4 file. Subsequently, a "moov" box and a "mdat" box are arranged. The "moov" box includes all metadata, for example, header information of each track, a meta description of a content substance, time information, and the like. The "mdat" box includes a media data body.

Figure 7B:
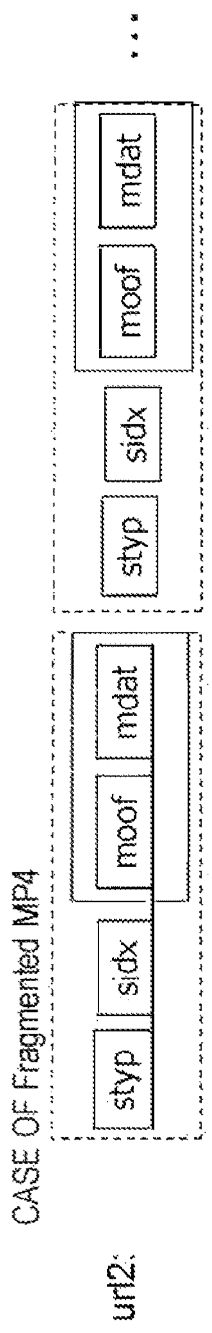

In the case of a fragmented MP4, there are cases in which "url 2" is defined as illustrated in FIG. 7(b), for example. In this case, a "styp" box describing a segment type is first arranged. Then, a "sidx" box describing a segment index is arranged. Subsequently, a predetermined number of movie fragments are arranged. Here, the movie fragment is configured with a "moof" box including control information and a "mdat" box including a media data body. Since a fragment obtained by fragmenting a transmission media is included in the "mdat" box of one movie fragment, the control information included in the "moof" box is control information related to the fragment.

Figure 7C:
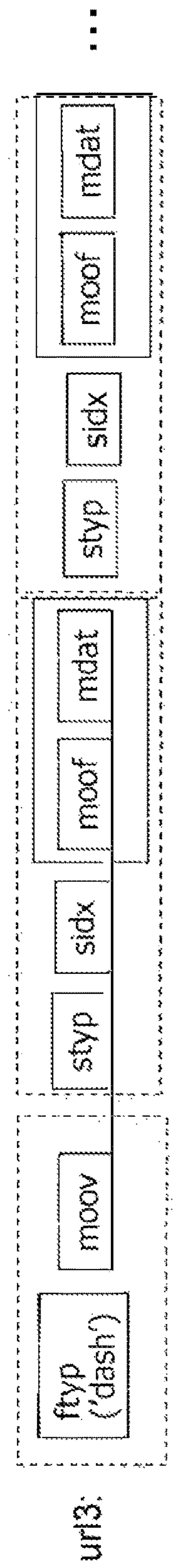

Further, a combination of "url 1" and "url 2" is also considered. In this case, for example, "url 1" may be set as an initialization segment, and "url 1" and "url 2" may be set as an MP4 of one service. Alternatively, "url 1" and "url 2" may be combined into one and defined as "url 3" as illustrated in FIG. 7(c).

The set top box 200 receives the DASH/MP4, that is, the MPD file serving as the metafile and the MP4 including the media stream (the media segment) such as a video or an audio, which is transmitted from the service transmission system 100 via the RF transmission path or the communication network transmission path. The access information for a connection to a predetermined network service is inserted into the audio stream included in the MP4 as the metadata. The identification information indicating that the metadata is inserted into the audio stream is inserted into the MPD file using the "Supplementary Descriptor."

The set top box 200 transmits the audio stream to the television receiver 300 via the HDMI cable 400 together with the identification information indicating that the metadata is inserted into the audio stream.

Here, the set top box 200 inserts the audio stream and the identification information into a blanking period of time of the image data obtained by decoding the video stream, transmits the image data to the television receiver 300, and transmits the audio stream and the identification information to the television receiver 300. The set top box 200 inserts the identification information into, for example, an audio InfoFrame packet.

Figure 3A:
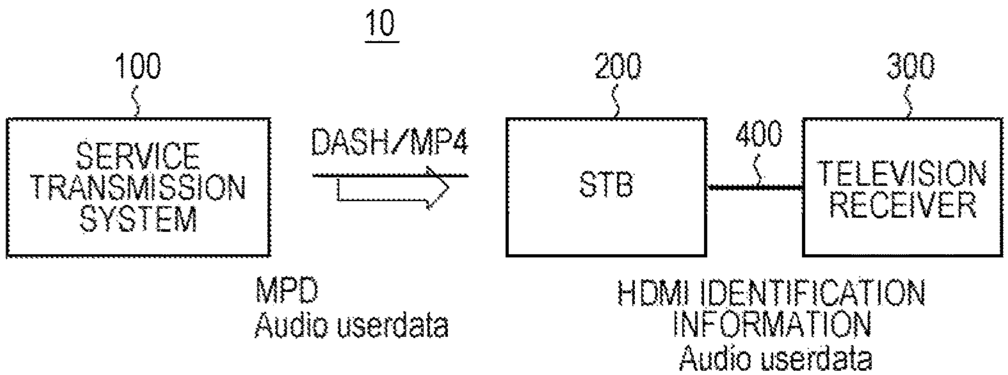
FIGS. 3(*a*) and 3(*b*) are block diagrams illustrating exemplary configuration of a transceiving system according to an embodiment.

The television receiver 300 receives the audio stream from the set top box 200 in the transceiving system 10 illustrated in FIG. 3(a) via the HDMI cable 400 together with the identification information indicating that the metadata is inserted into the audio stream. In other words, the television receiver 300 receives the image data in which the audio stream and the identification information are inserted into the blanking period of time from the set top box 200.

Then, the television receiver 300 decodes the audio stream based on the identification information, extracts the metadata, and performs a process using the metadata. In this case, the television receiver 300 accesses a predetermined server on the network based on predetermined network service information serving as the metadata.

Figure 3B:
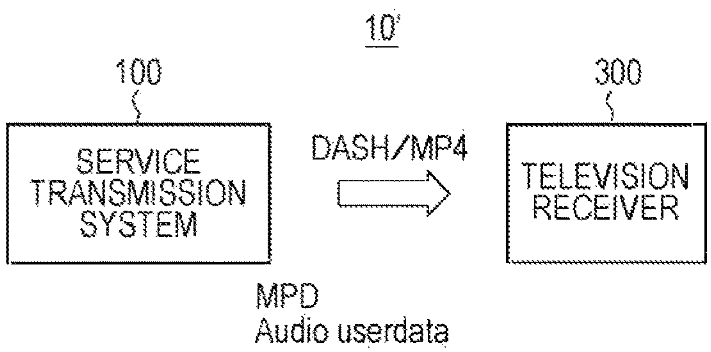

The television receiver 300 receives the DASH/MP4, that is, the MPD file serving as the metafile and the MP4 including the media stream (the media segment) such as a video or an audio, which are transmitted from the service transmission system 100 in the transceiving system 10' illustrated in FIG. 3(b) via the RF transmission path or the communication network transmission path. The access information for a connection to a predetermined network service is inserted into the audio stream included in the MP4 as the metadata. The identification information indicating that the metadata is inserted into the audio stream is inserted into the MPD file using the "Supplementary Descriptor."

Then, the television receiver 300 decodes the audio stream based on the identification information, extracts the metadata, and performs a process using the metadata. In this case, the television receiver 300 accesses a predetermined server on the network based on predetermined network service information serving as the metadata.

[DASH/MP4 Generating Unit of Service Transmission System]

Figure 8:
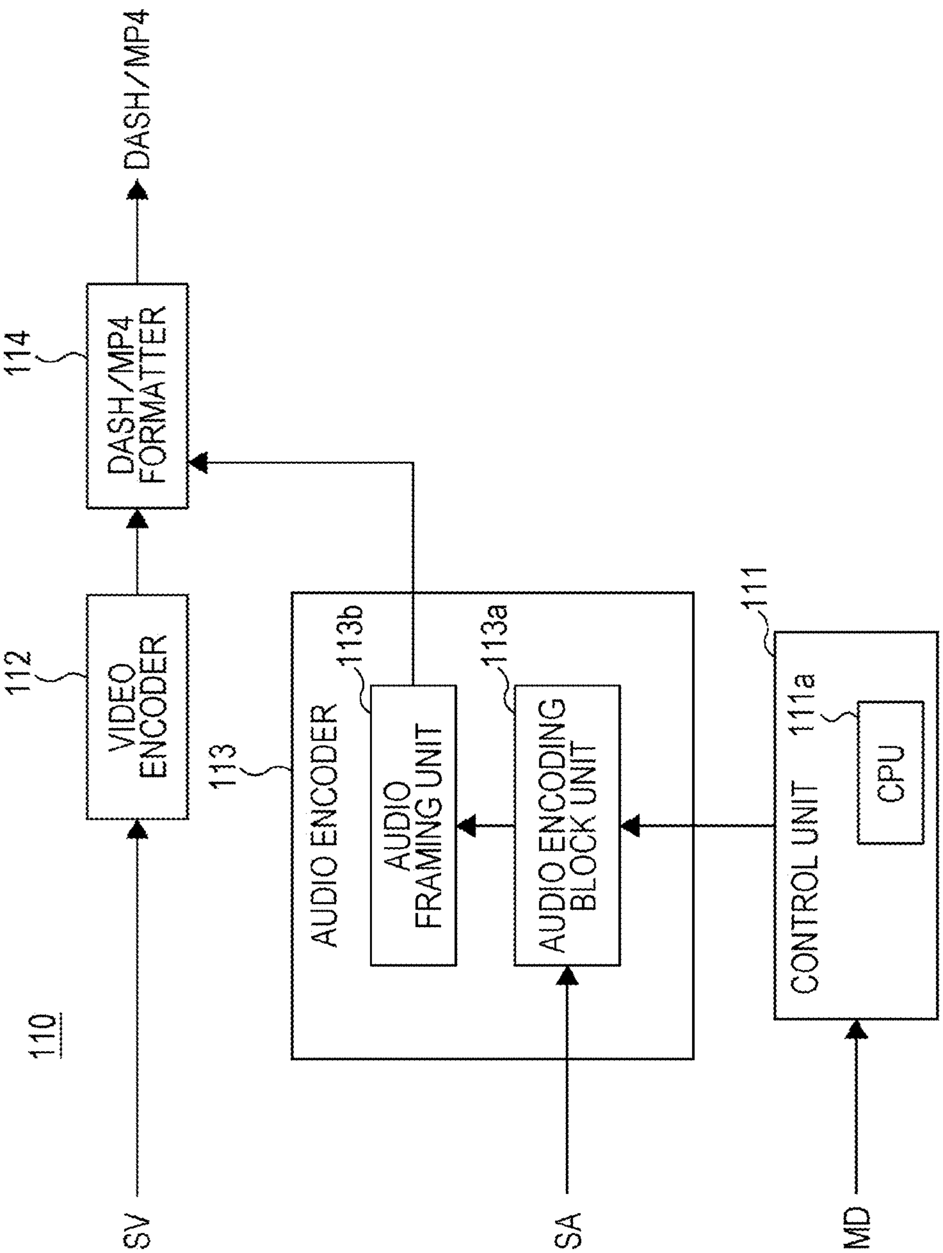
FIG. 8 is a block diagram illustrating an exemplary configuration of a DASH/MP4 generating unit with which a service transmission system is equipped.

FIG. 8 illustrates an exemplary configuration of a DASH/MP4 generating unit 110 with which the service transmission system 100 is equipped. The DASH/MP4 generating unit 110 includes a control unit 111, a video encoder 112, an audio encoder 113, and a DASH/MP4 formatter 114.

The control unit 111 includes a CPU 111*a*, and controls the respective units of the DASH/MP4 generating unit 110. The video encoder 112 performs encoding such as MPEG2, H.264/AVC, or H.265/HEVC on image data SV, and generates a video stream (a video elementary stream). Examples of the image data SV include image data reproduced from a recording medium such as a HDD and live image data obtained by a video camera.

The audio encoder 113 performs encoding on the audio data SA according to a compression format such as AAC, AC3, AC4, MPEGH (3D audio), and generates an audio stream (an audio elementary stream). The audio data SA is audio data corresponding to the image data SV, and examples of the audio data SA include audio data reproduced from a recording medium such as a HDD or live audio data obtained by a microphone.

The audio encoder 113 includes an audio encoding block unit 113*a* and an audio framing unit 113*b*. An encoded block is generated through the audio encoding block unit 113*a* and framed through the audio framing unit 113*b*. In this case, an encoded block and framing differ according to a compression format.

The audio encoder 113 inserts metadata MD into the audio stream under control of the control unit 111. In this embodiment, the metadata MD is the access information for a connection to a predetermined network service. Here, all services such as a music network service and an audio video network service can be a predetermined network service. Here, the metadata MD is embedded in a user data region of the audio stream.

The DASH/MP4 formatter 114 generates an MP4 including the media stream (the media segment) such as a video or an audio serving as content based on the video stream output from the video encoder 112 and the audio stream output from the audio encoder 113. The DASH/MP4 formatter 114 generates the MPD file using content metadata, segment URL information, and the like. Here, for example, the identification information indicating that the metadata is inserted into the audio stream is inserted into the MPD file (see FIG. 4).

An operation of the DASH/MP4 generating unit 110 illustrated in FIG. 8 will briefly be described. The image data SV is supplied to the video encoder 112. The video encoder 112 performs encoding such as H.264/AVC or H.265/HEVC on the image data SV, and generates the video stream including encoded video data.

The audio data SA is supplied to the audio encoder 113. The audio encoder 113 performs encoding such as AAC, AC3, AC4, MPEGH (3D audio) on the audio data SA, and generates the audio stream.

At this time, the metadata MD and the size information for embedding the metadata MD in the user data region are supplied from the control unit 111 to the audio encoder 113. Then, the audio encoder 113 embeds the metadata MD in the user data region of the audio stream.

The video stream generated by the video encoder 112 is supplied to the DASH/MP4 formatter 114. The audio stream including the metadata MD embedded in the user data region, which is generated by the audio encoder 113 is supplied to the DASH/MP4 formatter 114. Then, the DASH/MP4 formatter 114 generates the MP4 including the media stream (the media segment) such as a video or an audio serving as content. The DASH/MP4 formatter 114 generates the MPD file using the content metadata, the segment URL information, and the like. At this time, for example, the identification information indicating that the metadata is inserted into the audio stream is inserted into the MPD file.

[Details of Insertion of Metadata MD in Respective Compression Formats]

[Example of AAC]

Figure 9:
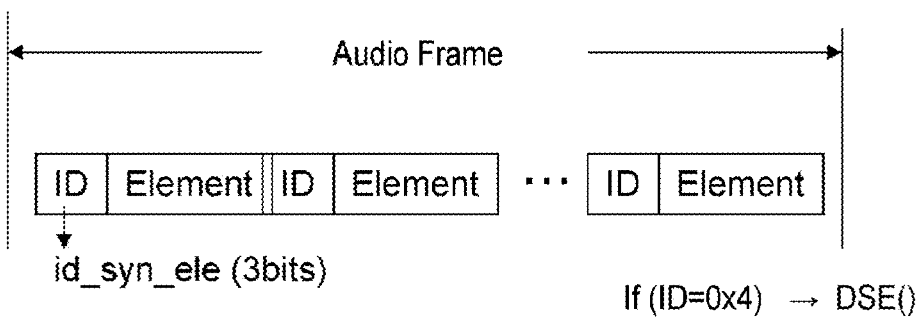
FIG. 9 is a diagram illustrating a structure of an audio frame of AAC.

First, an example in which the compression format is advanced audio coding (AAC) will be described. FIG. 9 illustrates a structure of the audio frame of AAC. The audio frame includes a plurality of elements. A 3-bit identifier (ID) of "id_syn_ele" identifying content of an element is arranged in the head of each element.

When "id_syn_ele" is "0x4," it indicates that an element is a data stream element (DSE) serving as an element in which user data can be arranged. When the compression format is AAC, the metadata MD is inserted into the DSE. FIG. 10 illustrates a configuration (syntax) of the DSE (Data Stream Element( )).

A 4-bit field of "element_instance_tag" indicates a data type in the DSE, and when the DSE is used as a unified user data, a value thereof may be "0." "Data_byte_align_flag" is set to "1," and the entire DSE is byte-aligned. A value of "count" or "esc_count" indicating the number of additional bytes is appropriately decided according to the size of the user data. "metadata( )" is inserted into a field of "data_stream_byte."

FIG. 11(*a*) illustrates a configuration (syntax) of "metadata( )" and FIG. 11(*b*) illustrates content of main information (semantics) in the configuration. A 32-bit field of "userdata_identifier" indicates audio user data by a setting of a value of an arrangement that is defined in advance. When "userdata_identifier" indicates the user data by "AAAA," an 8-bit field of "metadata_type" is included. This field indicates a type of metadata. For example, "0x08" indicates that the metadata is the access information for a connection to a predetermined network service, and the access information is included in "SDO_payload( )" of ATSC. When it is "0x08," "SDO_payload( )" is included. Here, "ATSC" is used, but it may be used in any other standardization organization.

FIG. 12 illustrates a configuration (syntax) of "SDO_payload( )" When a command ID (cmdID) is smaller than "0x05," a field of "URI_character" is included. A character code indicating URI information for a connection to a predetermined network service is inserted into this field. FIG. 13 illustrates a meaning of a value of the command ID (cmdID). "SDO_payload( )" was standardized by Advanced Television Systems Committee standards (ATSC).

[Example of AC3]

Figure 14:
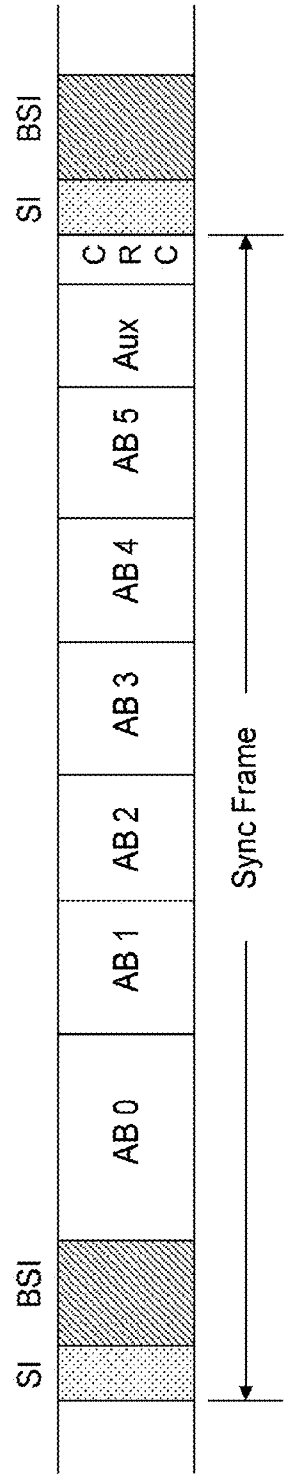
FIG. 14 is a diagram illustrating a structure of a frame (AC3 synchronization frame) of AC3.

Next, an example in which the compression format is AC3 will be described. FIG. 14 illustrates a structure of a frame (AC3 synchronization frame) of AC3. The audio data SA is encoded so that a total size of "mantissa data" of "Audblock 5," "AUX," and "CRC" does not exceed ⅜ of the total size. When the compression format is AC3, the metadata MD is inserted into an area of "AUX." FIG. 15 illustrates a configuration (syntax) of auxiliary data of AC3.

When "auxdatae" is "1," "aux data" is enabled, and data of a size indicated by 14 bits (bit units) of "auxdata1" is defined in "auxbits." At this time, a size of "auxbits" is described in "nauxbits." In the present technology, a field of "auxbits" is defined as "metadata( )" In other words, "metadata( )" illustrated in FIG. 11(*a*) is inserted into the field of "auxbits," and "SDO_payload( )" (see FIG. 12) of ATSC including the access information for a connection to a predetermined network service is arranged in the field of "data_byte" according to the syntax structure illustrated in FIG. 11(*a*).

[Example of AC4]

Next, an example in which the compression format is AC4 will be described. AC4 is one of next generation audio coding formats of AC3. FIG. 16(*a*) illustrates a structure of a simple transport layer of AC4. There are a field of a sync word (syncWord), a field of a frame length (frame Length), a field of "RawAc4Frame" serving as a field of encoded data, and a CRC field. The field of "RawAc4Frame" includes a field of a table of content (TOC) arranged in the head and a field of a predetermined number of sub streams (Substream) subsequent thereto as illustrated in FIG. 16(*b*).

As illustrated in FIG. 17(*b*), the sub stream (ac4_substream_data( )) includes a metadata region (metadata), and a field of "umd_payloads_substream( )" is arranged therein. "SDO_payload( )" (see FIG. 12) of ATSC including the access information for a connection to a predetermined network service is arranged in the field of "umd_payloads_substream( )."

Further, as illustrated in FIG. 17(*a*), the TOC (ac4_toc( )) includes a field of "ac4_presentation_info( )" and further includes a field of "umd_info( )" which indicates that the metadata is inserted into the field of "umd_payloads_substream( ))."

FIG. 18 illustrates a configuration (syntax) "umd_info( )." A field of "umd_version" indicates a version number. A field of "substream_index" indicates an index value. A combination of the version number and the index value is defined to indicate that the metadata is inserted into the field of "umd_payloads_substream( ))."

FIG. 19 illustrates a configuration (syntax) "umd_payloads_substream ( )." A 5-bit field of "umd_payload_id" is set to a value other than "0." A 32-bit field of "umd_userdata_identifier" indicates the audio user data by a setting of a value of an arrangement that is defined in advance. A 16-bit field of "umd_payload_size" indicates the number of subsequent bytes. When "umd_userdata_identifier" indicates the user data by "AAAA," an 8-bit field of "umd_metadata_type" is included. This field indicates a type of metadata. For example, "0x08" indicates that the metadata is the access information for a connection to a predetermined network service, and the access information is included in "SDO_payload( )" of ATSC. When it is "0x08," "SDO_payload( )" (see FIG. 12) is included.

[Example of MPEGH]

Figure 20:
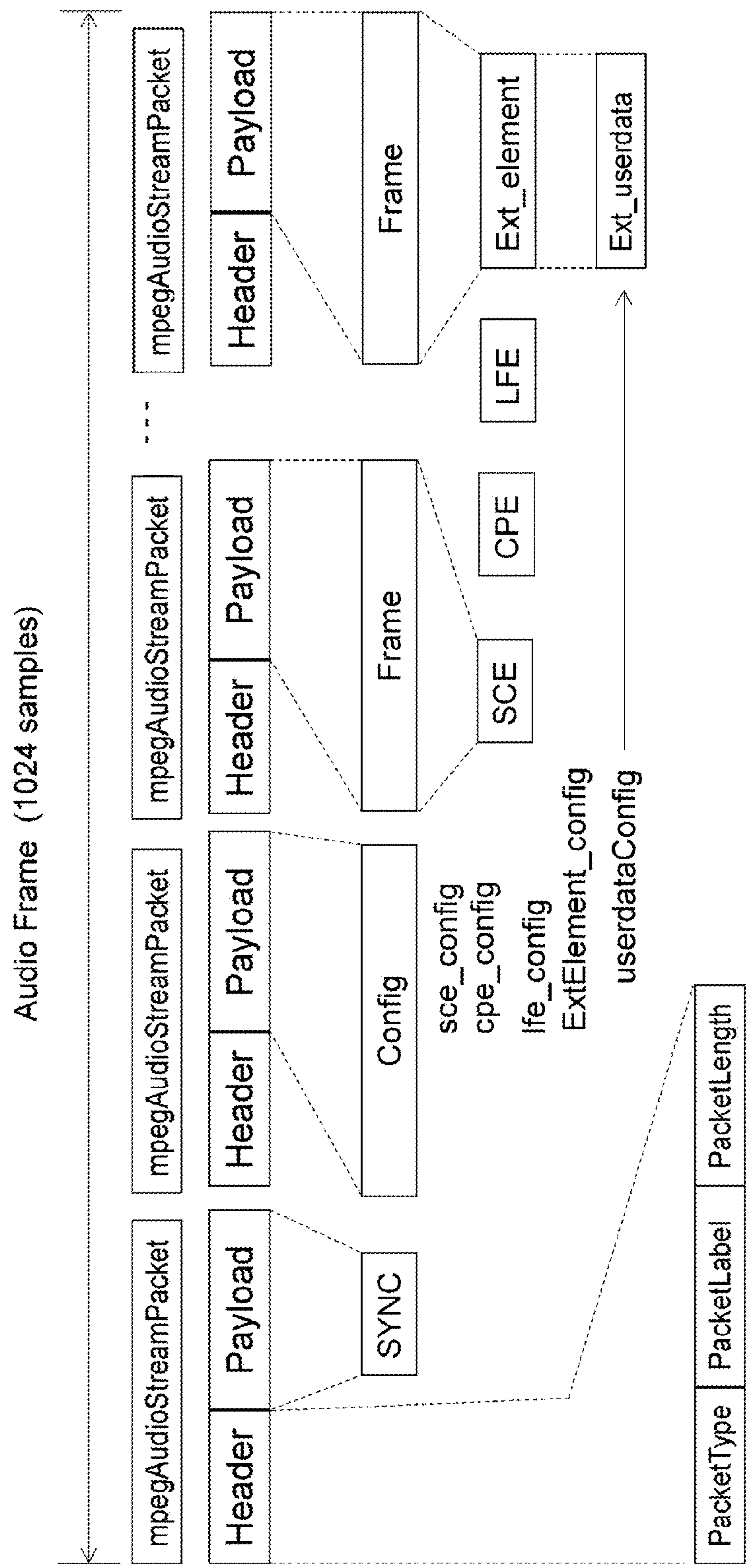
FIG. 20 is a diagram illustrating a structure of an audio frame (1024 samples) in transmission data of MPEGH (3D audio).

Next, an example in which the compression format is MPEGH (3D audio) will be described. FIG. 20 illustrates a structure of an audio frame (1024 samples) in transmission data of MPEGH (3D audio). The audio frame is configured with a plurality of MPEG audio stream packets (mpeg Audio Stream Packets). Each MPEG audio stream packet is configured with a header and a payload.

The header includes information such as a packet type, a packet label, and a packet length. Information defined by the packet type of the header is arranged in the payload. The payload information includes "SYNC" corresponding to a synchronization start code, "Frame" serving an actual data of transmission data of a 3D audio, and "Config" indicating a configuration of "Frame."

Channel encoded data and object encoded data configuring the transmission data of the 3D audio are included in "Frame." Here, the channel encoded data is configured with encoded sample data such as a single channel element (SCE), a channel pair element (CPE), and a low frequency element (LFE). The object encoded data is configured with the encoded sample data of the SCE and the metadata for mapping the encoded sample data with a speaker located at an arbitrary position and rendering the encoded sample data. The metadata is included as an extension element (Ext_element).

Figure 21:
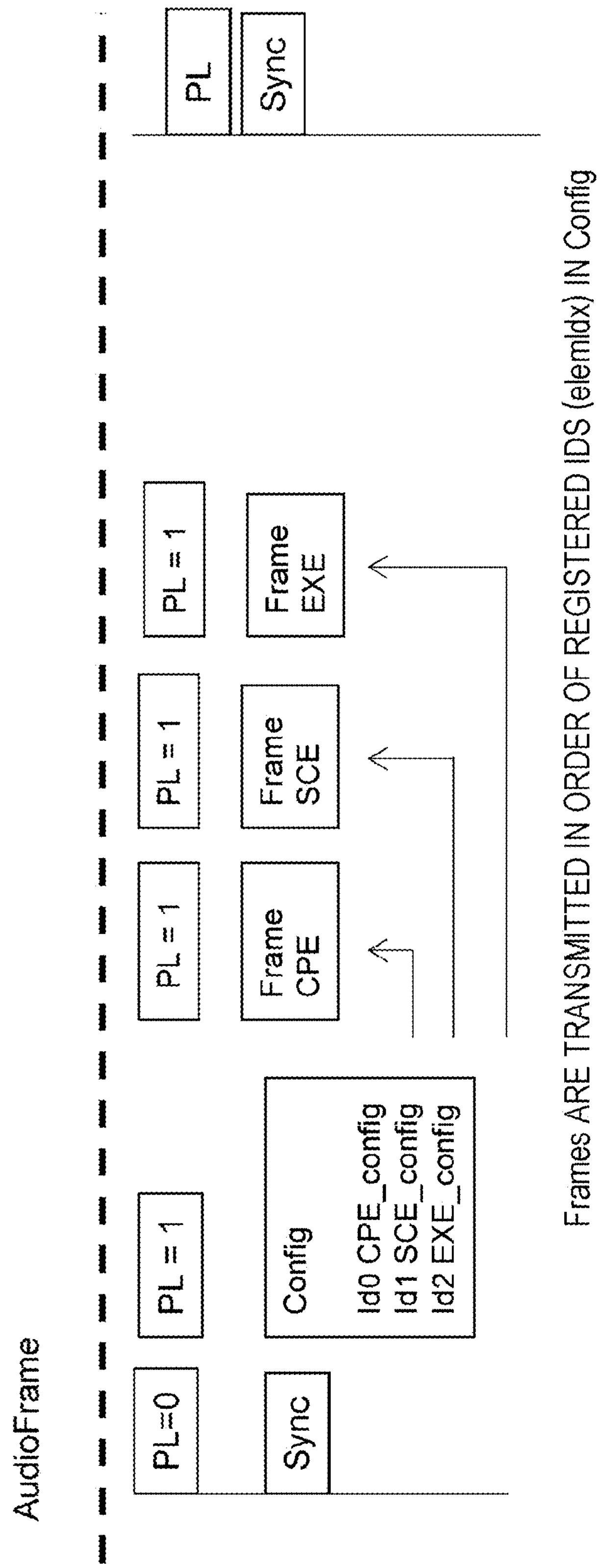
FIG. 21 is a diagram for describing that a correspondence of configuration information (config) of each "Frame" included in "Config" and each "Frame" is held.

Here, a correspondence of the configuration information (config) of each "Frame" included in "Config" and each "Frame" is held as follows. In other words, as illustrated in FIG. 21, the configuration information (config) of each "Frame" is registered in "Config" using an ID (elemIdx), and each "Frame" is transmitted in the order of the registered IDs. The values of the packet labels (PLs) are the same in "Config" and "Frames" corresponding thereto.

Referring back to FIG. 20, in this embodiment, an element (Ext_userdata) including user data (userdata) is newly defined as an extension element (Ext_element). Thus, configuration information (userdataConfig) of the element (Ext_userdata) is newly defined in "Config."

FIG. 22 illustrates a correspondence relation between a type (ExElementType) of the extension element (Ext_element) and a value thereof. In a current state, 0 to 7 are decided. Since 128 and higher are extendable for use outside MPEG, for example, 128 is defined as a value of a type of "ID_EXT_ELE_userdata."

FIGS. 23(*a*) and 23(*b*) illustrate a configuration (syntax) of "userdataConfig( )" A 32-bit field of "userdata_identifier" indicates audio user data by a setting of a value of an arrangement that is defined in advance. A 16-bit field of "userdata_frameLength" indicates the number of bytes of "audio_userdata( )" FIG. 24 illustrates a configuration (syntax) of "audio_userdata( )." When "userdata_identifier" of "userdataConfig( )" indicates the user data by "AAAA," an 8-bit field of "metadataType" is included. This field indicates a type of metadata. For example, "0x08" indicates that the metadata is the access information for a connection to a predetermined network service, and the access information is included in "SDO_payload( )" of ATSC. When it is "0x08," "SDO_payload( )" (see FIG. 12) is included.

[Exemplary Configuration of Set Top Box]

Figure 25:
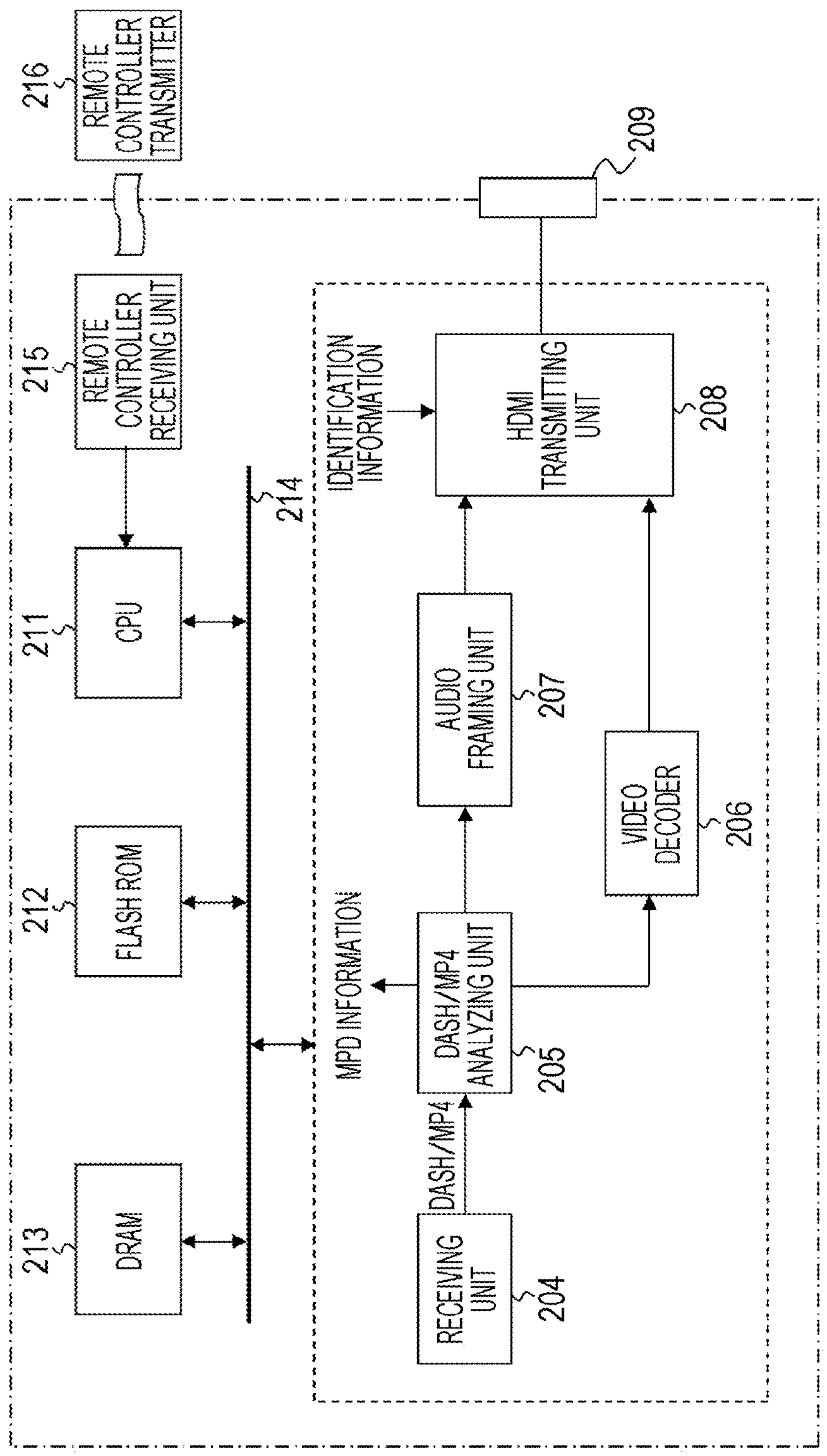
FIG. 25 is a block diagram illustrating an exemplary configuration of a set top box configuring a transceiving system.

FIG. 25 illustrates an exemplary configuration of the set top box 200. The set top box 200 includes a receiving unit 204, a DASH/MP4 analyzing unit 205, a video decoder 206, an audio framing unit 207, a HDMI transmitting unit 208, and a HDMI terminal 209. The set top box 200 further includes a CPU 211, a flash ROM 212, a DRAM 213, an internal bus 214, a remote controller receiving unit 215, and a remote controller transmitter 216.

The CPU 211 controls operations of the respective units of the set top box 200. The flash ROM 212 stores control software and holds data. The DRAM 213 configures a work area of the CPU 211. The CPU 211 activates software read from the flash ROM 212 or develops data onto the DRAM 213 and activates software, and controls the respective units of the set top box 200.

The remote controller receiving unit 215 receives a remote control signal (a remote controller code) transmitted from the remote controller transmitter 216, and supplies the remote control signal (the remote controller code) to the CPU 211. The CPU 211 controls the respective units of the set top box 200 based on the remote controller code. The CPU 211, the flash ROM 212, and the DRAM 213 are connected to the internal bus 214.

The receiving unit 204 receives the DASH/MP4, that is, the MPD file serving as the metafile and the MP4 including the media stream (the media segment) such as a video or an audio, which are transmitted from the service transmission system 100 via the RF transmission path or the communication network transmission path. The access information for a connection to a predetermined network service is inserted into the audio stream included in the MP4 as the metadata. The identification information indicating that the metadata is inserted into the audio stream is inserted into the MPD file using the "Supplementary Descriptor."

The DASH/MP4 analyzing unit 205 analyzes the MPD file and the MP4 received by the receiving unit 204. The DASH/MP4 analyzing unit 205 extracts the MPD information included in the MPD file, and transfers the MPD information to the CPU 211. Here, the MPD information also includes, for example, the identification information indicating that the metadata is inserted into the audio stream. The CPU 211 controls a process of acquiring the video and audio streams based on the MPD information. The DASH/MP4 analyzing unit 205 extracts the metadata such as the header information of each track, a meta description of a content substance, time information, and the like from the MP4, and transmits the extracted metadata to the CPU 211.

The DASH/MP4 analyzing unit 205 extracts the video stream from the MP4, and transfers the extracted video stream to the video decoder 206. The video decoder 206 performs the decoding process on the video stream, and obtains the uncompressed image data. The DASH/MP4 analyzing unit 205 extracts the audio stream from the MP4, and transfers the extracted audio stream to the audio framing unit 207. The audio framing unit 207 performs framing on the audio stream.

The HDMI transmitting unit 208 transmits the uncompressed image data obtained through the video decoder 206 and the audio stream framed by the audio framing unit 207 through the HDMI terminal 209 according to communication complying with the HDMI. The HDMI transmitting unit 208 packs the image data and the audio stream for transmission through the TMDS channel of the HDMI, and transfers the resulting data to the HDMI terminal 209.

The HDMI transmitting unit 208 inserts the identification information indicating that the metadata is inserted into the audio stream under control of the CPU 211. The HDMI transmitting unit 208 inserts the audio stream and the identification information into the blanking period of time of the image data. The HDMI transmitting unit 209 will be described in detail.

In this embodiment, the HDMI transmitting unit 208 inserts the identification information into the audio InfoFrame packet arranged in the blanking period of time of the image data. The audio InfoFrame packet is arranged in a data island period.

FIG. 26 illustrates an exemplary structure of the audio InfoFrame packet. In the HDMI, supplementary information related to a sound can be transmitted from a source device to a sink device through the audio InfoFrame packet.

"Packet Type" indicating a kind of a data packet is defined in a 0-th byte, and the audio InfoFrame packet is set to "0x84." Version information of a packet data definition is described in a 1st byte. Information indicating a packet length is described in a 2nd byte. In this embodiment, 1-bit flag information of "userdata_presence_flag" is defined in a 5th bit of a 5th byte. When the flag information is "1," it indicates that the metadata is inserted into the audio stream.

When the flag information is "1," various information is defined in a 9th byte. 7th to 5th bits are used as a field of "metadata_type," a 4th bit is used as a field of "coordinated_control_flag," and 2nd to 0-th bits are used as a field of "frequency_type." Although a detailed description is omitted, the respective fields indicate the same information as the respective information added to the MPD file illustrated in FIG. 4.

An operation of the set top box 200 will briefly be described. The receiving unit 204 receives the DASH/MP4, that is, the MPD file serving as the metafile and the MP4 including the media stream (the media segment) such as a video or an audio, which are transmitted from the service transmission system 100 via the RF transmission path or the communication network transmission path. As described above, the received MPD file and the MP4 are supplied to the DASH/MP4 analyzing unit 205.

The DASH/MP4 analyzing unit 205 analyzes the MPD file and the MP4. The DASH/MP4 analyzing unit 205 extracts the MPD information included in the MPD file, and transfers the MPD information to the CPU 211. Here, the MPD information also includes, for example, the identification information indicating that the metadata is inserted into the audio stream. The DASH/MP4 analyzing unit 205 extracts the metadata such as the header information of each track, a meta description of a content substance, time information, and the like from the MP4, and transmits the extracted metadata to the CPU 211.

The DASH/MP4 analyzing unit 205 extracts the video stream from the MP4, and transfers the video stream to the video decoder 206. The video decoder 206 performs the decoding process on the video stream, and obtains uncompressed image data. The image data is supplied to the HDMI transmitting unit 208. The DASH/MP4 analyzing unit 205 extracts the audio stream from the MP4. The audio stream is framed by the audio framing unit 207 and then supplied to the HDMI transmitting unit 208. Then, the HDMI transmitting unit 208 packs the image data and the audio stream, and transmits the resulting data from the HDMI terminal 209 to the HDMI cable 400.

The HDMI transmitting unit 208 inserts the identification information indicating that the metadata is inserted into the audio stream into the audio InfoFrame packet arranged in the blanking period of time of the image data under control of the CPU 211. Thus, the identification information indicating that the metadata is inserted into the audio stream is transmitted from the set top box 200 to the HDMI television receiver 300.

[Exemplary Configuration of Television Receiver]

Figure 27:
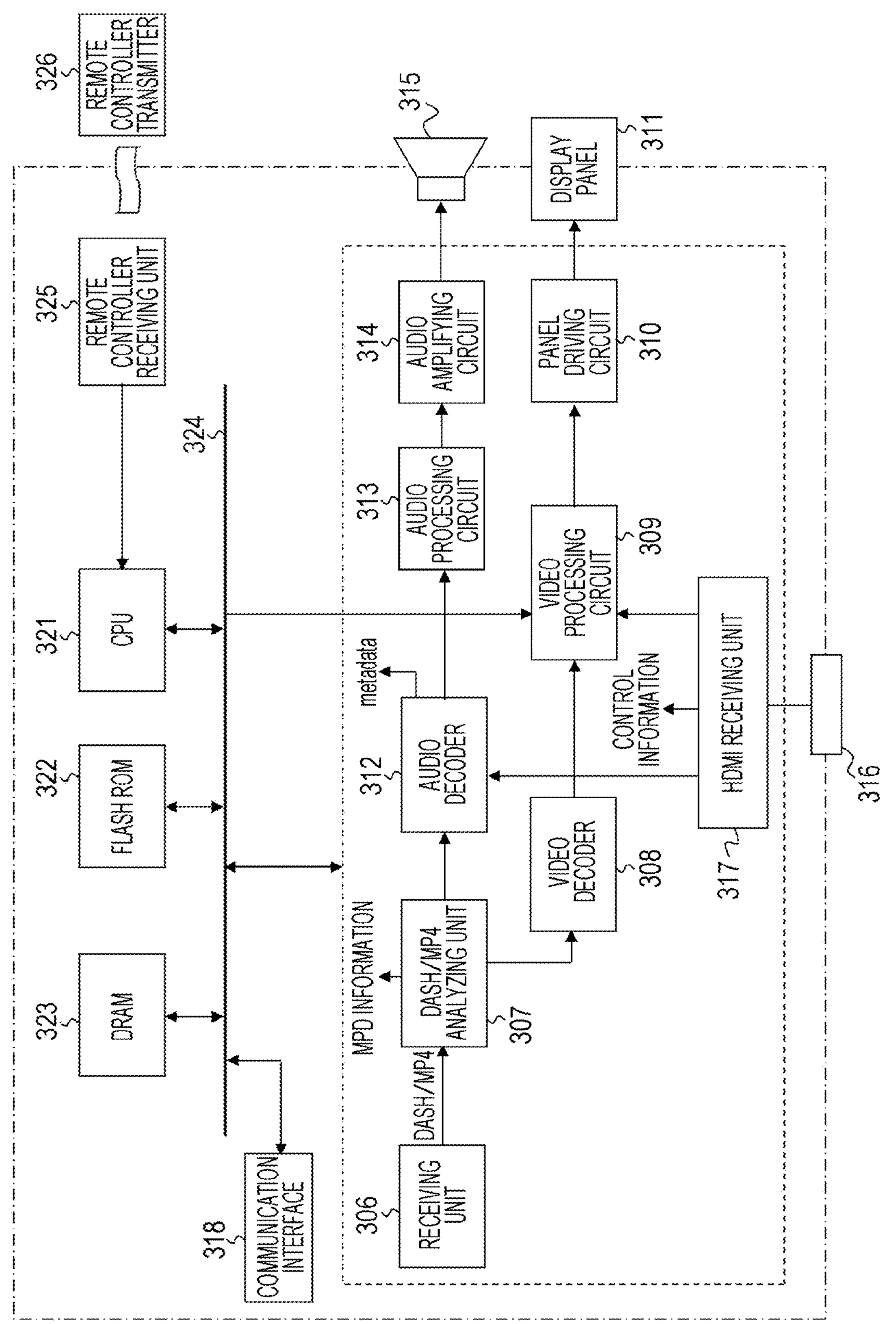
FIG. 27 is a block diagram illustrating an exemplary configuration of a television receiver configuring a transceiving system.

FIG. 27 illustrates an exemplary configuration of the television receiver 300. The television receiver 300 includes a receiving unit 306, a DASH/MP4 analyzing unit 307, a video decoder 308, a video processing circuit 309, a panel driving circuit 310, and a display panel 311.

The television receiver 300 includes an audio decoder 312, an audio processing circuit 313, an audio amplifying circuit 314, a speaker 315, a HDMI terminal 316, a HDMI receiving unit 317, and a communication interface 318. The television receiver 300 also includes a CPU 321, a flash ROM 322, a DRAM 323, an internal bus 324, a remote controller receiving unit 325, and a remote controller transmitter 326.

The CPU 321 controls operations of the respective units of the television receiver 300. The flash ROM 322 stores control software and holds data. The DRAM 323 configures a work area of the CPU 321. The CPU 321 activates software read from the flash ROM 322 or develops data onto the DRAM 323 and activates software, and controls the respective units of the television receiver 300.

The remote controller receiving unit 325 receives a remote control signal (a remote controller code) transmitted from the remote controller transmitter 326, and supplies the remote control signal (the remote controller code) to the CPU 321. The CPU 321 controls the respective units of the television receiver 300 based on the remote controller code. The CPU 321, the flash ROM 322, and the DRAM 323 are connected to the internal bus 324.

The communication interface 318 performs communication with a server located on a network such as the Internet under control of the CPU 321. The communication interface 318 is connected to the internal bus 324.

The receiving unit 306 receives the DASH/MP4, that is, the MPD file serving as the metafile and the MP4 including the media stream (the media segment) such as a video or an audio, which are transmitted from the service transmission system 100 via the RF transmission path or the communication network transmission path. The access information for a connection to a predetermined network service is inserted into the audio stream included in the MP4 as the metadata. For example, the identification information indicating that the metadata is inserted into the audio stream is inserted into the MPD file using the "Supplementary Descriptor."

The DASH/MP4 analyzing unit 307 analyzes the MPD file and the MP4 received by the receiving unit 306. The DASH/MP4 analyzing unit 307 extracts the MPD information included in the MPD file, and transfers the extracted MPD information to the CPU 321. The CPU 321 controls a process of acquiring the video and audio streams based on the MPD information. The DASH/MP4 analyzing unit 307 extracts the metadata such as the header information of each track, a meta description of a content substance, time information, and the like from the MP4, and transmits the extracted metadata to the CPU 321.

The DASH/MP4 analyzing unit 307 extracts the video stream from the MP4, and transfers the extracted video stream to the video decoder 308. The video decoder 308 performs the decoding process on the video stream, and obtains the uncompressed image data. The DASH/MP4 analyzing unit 307 extracts the audio stream from the MP4, and transfers the extracted audio stream to the audio decoder 312.

The HDMI receiving unit 317 receives the image data and the audio stream supplied to the HDMI terminal 316 via the HDMI cable 400 according to communication complying with the HDMI. The HDMI receiving unit 317 extracts various control information inserted into the blanking period of time of the image data, and transmits the extracted control information to the CPU 321. Here, the control information also includes, for example, the identification information that indicates that the metadata is inserted into the audio stream and is inserted into the audio InfoFrame packet (see FIG. 26). The HDMI receiving unit 317 will be described in detail later.

The video processing circuit 309 obtains a display image data by performing a scaling process, a synthesis process, and the like on the image data that is obtained through the video decoder 308 or the HDMI receiving unit 316 and the image data received from the server on the network through the communication interface 318.

The panel driving circuit 310 drives the display panel 311 based on the display image data obtained through the video processing circuit 308. The display panel 311 is configured with, for example, a liquid crystal display (LCD), an organic electroluminescence display (organic EL display), or the like.

The audio decoder 312 obtains uncompressed audio data by performing the decoding process on the audio stream that is extracted by the DASH/MP4 analyzing unit 307 or obtained by the HDMI receiving unit 317. The audio decoder 312 extracts the metadata inserted into the audio stream under control of the CPU 321, and transmits the extracted metadata to the CPU 321. In this embodiment, the metadata is the access information for a connection to a predetermined network service (see FIG. 12). The CPU 321 appropriately causes the respective units of the television receiver 300 to perform a process using the metadata.

The MPD information is supplied from the DASH/MP4 analyzing unit 307 to the CPU 321. The CPU 321 can recognize that the metadata is inserted into the audio stream in advance based on the identification information included in the MPD information, and can control the audio decoder 312 such that the metadata is extracted.

The audio processing circuit 313 performs a necessary process such as D/A conversion on the audio data obtained through the audio decoder 312. The audio amplifying circuit 314 amplifies an audio signal output from the audio processing circuit 313, and supplies the amplified audio signal to the speaker 315.

An operation of the television receiver 300 illustrated in FIG. 27 will briefly be described. The receiving unit 306 receives the DASH/MP4, that is, the MPD file serving as the metafile and the MP4 including the media stream (the media segment) such as a video or an audio, which are transmitted from the service transmission system 100 via the RF transmission path or the communication network transmission path. As described above, the received MPD file and the MP4 are supplied to the DASH/MP4 analyzing unit 307.

The DASH/MP4 analyzing unit 307 analyzes the MPD file and the MP4. Then, the DASH/MP4 analyzing unit 307 extracts the MPD information included in the MPD file, and transfers the extracted MPD information to the CPU 321. Here, the MPD information also includes the identification information indicating that the metadata is inserted into the audio stream. The DASH/MP4 analyzing unit 307 extracts the metadata such as the header information of each track, a meta description of a content substance, time information, and the like from the MP4, and transmits the extracted metadata to the CPU 321.

The DASH/MP4 analyzing unit 307 extracts the video stream from the MP4, and transfers the extracted video stream to the video decoder 308. The video decoder 308 performs the decoding process on the video stream, and obtains the uncompressed image data. The image data is supplied to the video processing circuit 309. The DASH/MP4 analyzing unit 307 extracts the audio stream from the MP4. The audio stream is supplied to the audio decoder 312.

The HDMI receiving unit 317 receives the image data and the audio stream supplied to the HDMI terminal 316 via the HDMI cable 400 according to communication complying with the HDMI. The image data is supplied to the video processing circuit 309. The audio stream is supplied to the audio decoder 312.

The HDMI receiving unit 317 extracts various control information inserted into the blanking period of time of the image data, and transmits the extracted control information to the CPU 321. Here, the control information also includes, for example, the identification information that indicates that the metadata is inserted into the audio stream and is inserted into the audio InfoFrame packet. Thus, the CPU 321 controls the operation of the audio decoder 312 based on the identification information such that the metadata is extracted from the audio stream.

The video processing circuit 309 obtains a display image data by performing a scaling process, a synthesis process, and the like on the image data that is obtained through the video decoder 308 or the HDMI receiving unit 317 and the image data received from the server on the network through the communication interface 318. Here, when the television broadcast signal is received and processed, the video processing circuit 309 deals with the image data obtained through the video decoder 308. On the other hand, when the set top box 200 is connected through a HDMI interface, the video processing circuit 309 deals with the image data obtained through the HDMI receiving unit 317.

The display image data obtained through the video processing circuit 309 is supplied to the panel driving circuit 310. The panel driving circuit 310 drives the display panel 311 based on the display image data. As a result, the image corresponding to the display image data is displayed on the display panel 311.

The audio decoder 312 obtains the uncompressed audio data by performing the decoding process on the audio stream that is obtained through the DASH/MP4 analyzing unit 307 or the HDMI receiving unit 316. Here, when the television broadcast signal is received and processed, the audio decoder 312 deals with the audio stream obtained through the DASH/MP4 analyzing unit 307. On the other hand, when the set top box 200 is connected through the HDMI interface, the audio decoder 312 deals with the audio stream obtained through the HDMI receiving unit 317.

The audio data obtained through the audio decoder 312 is supplied to the audio processing circuit 313. The audio processing circuit 313 performs a necessary process such as D/A conversion on the audio data. The audio data is amplified by the audio amplifying circuit 314 and supplied to the speaker 315. As a result, the sound corresponding to the display image of the display panel 311 is output from the speaker 315.

The audio decoder 312 extracts the metadata inserted into the audio stream. For example, the metadata extraction process is reliably performed without waste by the CPU 321 detecting that the metadata is inserted into the audio stream based on the identification information and controlling the operation of the audio decoder 312 as described above.

The metadata extracted by the audio decoder 312 as described above is transferred to the CPU 321. The CPU 321 appropriately controls the respective units of the television receiver 300 such that the process using the metadata is performed. For example, the image data is acquired from the server on the network, and a multi-screen display is performed.

[Exemplary Configuration of HDMI Transmitting Unit and HDMI Receiving Unit]

Figure 28:
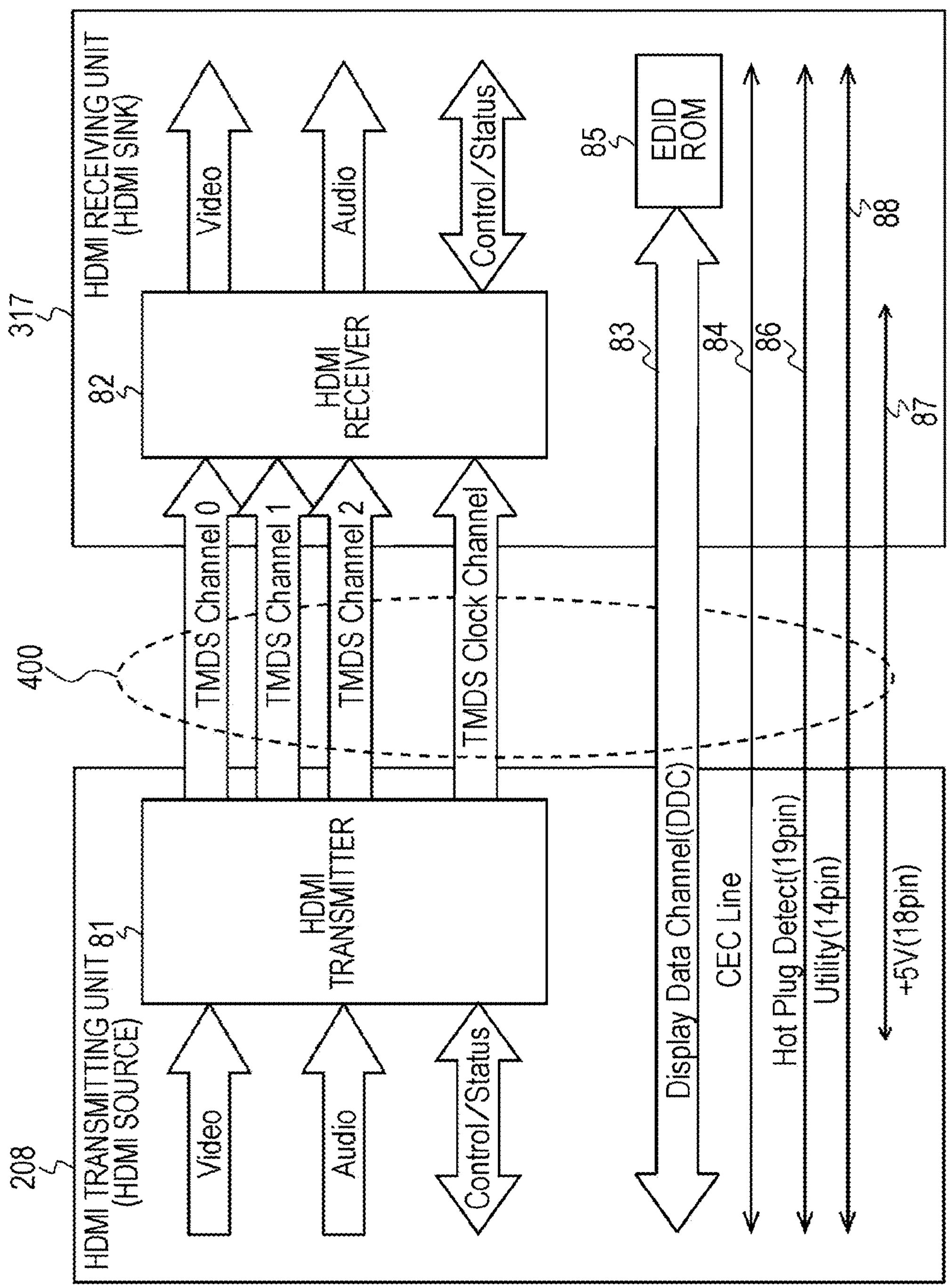
FIG. 28 is a block diagram illustrating an exemplary configuration of a HDMI transmitting unit of a set top box and a HDMI receiving unit of a television receiver.

FIG. 28 illustrates an exemplary configuration of the HDMI transmitting unit (HDMI source) 208 of the set top box 200 illustrated in FIG. 25 and the HDMI receiving unit (HDMI sink) 317 of the television receiver 300 illustrated in FIG. 27.

The HDMI transmitting unit 208 transmits a differential signal corresponding to pixel data of an image of one uncompressed screen to the HDMI receiving unit 317 in one direction through a plurality of channels during an effective image period (hereinafter, also referred to appropriately as an "active video period"). Here, the effective image period is a period obtained by subtracting a horizontal blanking period of time and a vertical blanking period of time from a period ranging from a certain vertical synchronous signal to a next vertical synchronous signal. The HDMI transmitting unit 208 transmits a differential signal corresponding to at least audio data or control data attached to an image, other auxiliary data, and the like to the HDMI receiving unit 317 in one direction through a plurality of channels in the horizontal blanking period of time or the vertical blanking period of time.

Transmission channels of a HDMI system configured with the HDMI transmitting unit 208 and the HDMI receiving unit 317 include the following transmission channels. In other words, there are three TMDS channels #0 to #2 as a transmission channel used for serially transmitting pixel data and audio data from the HDMI transmitting unit 208 to the HDMI receiving unit 317 in one direction in synchronization with a pixel clock. Further, as a transmission channel used for transmitting the pixel clock, there is a TMDS clock channel.

The HDMI transmitting unit 208 includes a HDMI transmitter 81. For example, the transmitter 81 converts pixel data of an uncompressed image into a corresponding differential signal, and serially transmits the differential signal to the HDMI receiving unit 317 connected through the HDMI cable 400 in one direction through a plurality of channels, that is, the three TMDS channels #0, #1, and #2.

The transmitter 81 converts the audio data attached to the uncompressed image, the necessary control data, other auxiliary data, and the like into the corresponding differential signal, and serially transmits the differential signal to the HDMI receiving unit 317 in one direction through the three TMDS channels #0, #1, and #2.

Further, the transmitter 81 transmits the pixel clock synchronized with the pixel data transmitted through the three TMDS channels #0, #1, and #2 to the HDMI receiving unit 317 connected through the HDMI cable 400 through the TMDS clock channel. Here, the pixel data of 10 bits is transmitted through one TMDS channel #i (i=0, 1, and 2) during one clock of the pixel clock.

The HDMI receiving unit 317 receives the differential signal corresponding to the pixel data transmitted from the HDMI transmitting unit 208 in one direction through a plurality of channels in the active video period. The HDMI receiving unit 317 receives the differential signal corresponding to the audio data or the control data transmitted from the HDMI transmitting unit 208 in one direction through a plurality of channels in the horizontal blanking period of time or the vertical blanking period of time.

In other words, the HDMI receiving unit 317 includes a HDMI receiver 82. The HDMI receiver 82 receives the differential signal corresponding to the pixel data and the differential signal corresponding to the audio data or the control data which are transmitted from the HDMI transmitting unit 208 in one direction through the TMDS channels #0, #1, and #2. In this case, the receiving is performed in synchronization with the pixel clock transmitted from the HDMI transmitting unit 208 through the TMDS clock channel.

The transmission channels of the HDMI system include a display data channel (DDC) 83 and a transmission channels called a CEC line 84 in addition to the TMDS channels #0 to #2 and the TMDS clock channel. The DDC 83 is configured with two signal lines (not illustrated) included in the HDMI cable 400. The DDC 83 is used when the HDMI transmitting unit 208 reads enhanced extended display identification data (E-EDID) from the HDMI receiving unit 317.

The HDMI receiving unit 317 includes an EDID read only memory (ROM) 85 that stores the E-EDID serving as performance information related to its performance (configuration/capability) in addition to the HDMI receiver 81. The HDMI transmitting unit 208 reads the E-EDID from the HDMI receiving unit 317 connected through the HDMI cable 400 through the DDC 83, for example, according to a request from the CPU 211 (see FIG. 20).

The HDMI transmitting unit 208 transfers the read E-EDID to the CPU 211. The CPU 211 stores the E-EDID in the flash ROM 212 or the DRAM 213.

The CEC line 84 is configured with a single signal line (not illustrated) included in the HDMI cable 400 and used for performing two-way communication of control data between the HDMI transmitting unit 208 and the HDMI receiving unit 317. The CEC line 84 configures a control data line.

The HDMI cable 400 includes a line (HPD line) 86 connected to a pin called a hot plug detect (HPD). A source device can detect a connection of a sink device using the line 86. The HPD line 86 is used as a HEAC-line configuring a two-way communication path as well. The HDMI cable 400 includes a power line 87 used for supplying electric power from the source device to the sink device. The HDMI cable 400 further includes a utility line 88. The utility line 88 is used as a HEAC+line configuring the two-way communication path as well.

Figure 29:
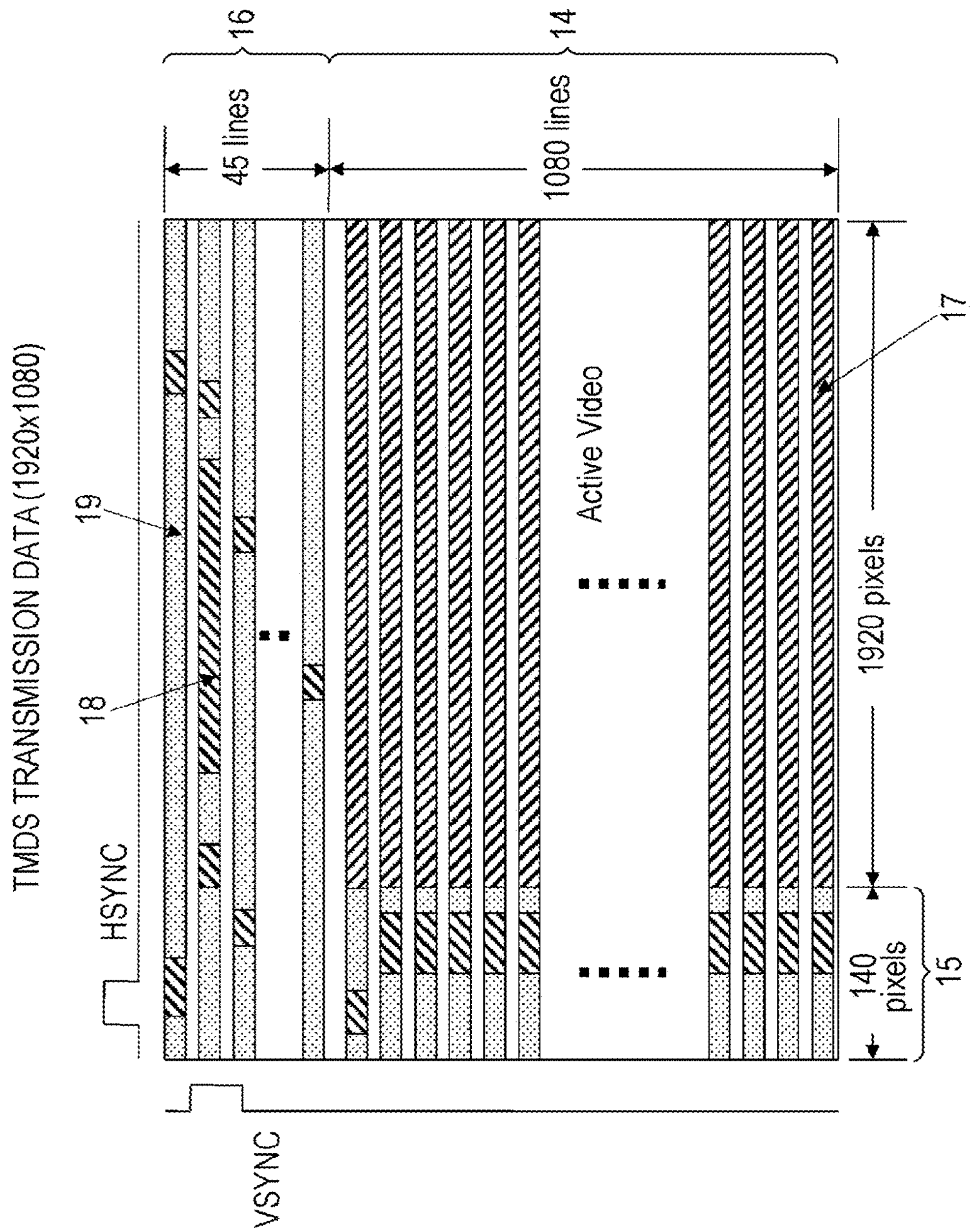
FIG. 29 is a diagram illustrating various kinds of transmission data periods when image data is transmitted through a TMDS channel.

FIG. 29 illustrates various kinds of transmission data periods when image data of 1920 pixels×1080 lines are transmitted through the TMDS channels #0, #1, and #2. There are three kinds of periods, that is, a video data period 17, a data island period 18, and a control period 19 in a video field in which transmission data is transmitted through the three TMDS channels #0, #1, and #2 of the HDMI according to the kind of transmission data.

Here, the video field period is a period ranging from a rising edge (Active Edge) of a certain vertical synchronous signal to a rising edge of a next vertical synchronous signal and divided into a horizontal blanking period of time 15 (Horizontal Blanking), a vertical blanking period of time 16 (Vertical Blanking), and an effective pixel period 14 (Active Video) serving as a period obtained by subtracting the horizontal blanking period of time and the vertical blanking period of time from the video field period.

The video data period 17 is allocated to the effective pixel period 14. In the video data period 17, data of effective pixels (Active Pixels) of 1920 pixels 1080 lines configuring image data of one uncompressed screen is transmitted. The data island period 18 and the control period 19 are allocated to the horizontal blanking period of time 15 and the vertical blanking period of time 16. In the data island period 18 and the control period 19, the auxiliary data is transmitted.

In other words, the data island period 18 is allocated to a part of the horizontal blanking period of time 15 and a part of the vertical blanking period of time 16. In the data island period 18, among the auxiliary data, a packet of data irrelevant to control, for example, a packet of the audio data is transmitted. The control period 19 is allocated to another part of the horizontal blanking period of time 15 and another part of the vertical blanking period of time 16. In the control period 19, among the auxiliary data, a packet of data relevant to control, for example, the vertical synchronous signal, the horizontal synchronous signal, a control packet, and the like are transmitted.

Next, a specific example of the process using the metadata in the television receiver 300 will be described with reference to FIG. 30. The television receiver 300 acquires, for example, an initial server URL, network service identification information, a target file name, a session start/end command, a media recording/reproducing command, and the like as the metadata. In the above description, the metadata has been described as being the access information for a connection to a predetermined network service, but other necessary information is assumed to be included in the metadata.

The television receiver 300 serving as a network client accesses a primary server using the initial server URL. Then, the television receiver 300 acquires information such as a streaming server URL, a target file name, a MIME type indicating a type of a file, and media reproduction time information from the primary server.

Then, the television receiver 300 accesses a streaming server using the streaming server URL. Then, the television receiver 300 designates the target file name. Here, when a service is received in a multicast manner, the television receiver 300 specifies a service of a program based on network identification information and service identification information.

Then, the television receiver 300 starts or ends a session with the streaming server according to the session start/end command. Further, the television receiver 300 acquires media data from the streaming server using the media recording/reproducing command during the session with the streaming server.

Figure 30:
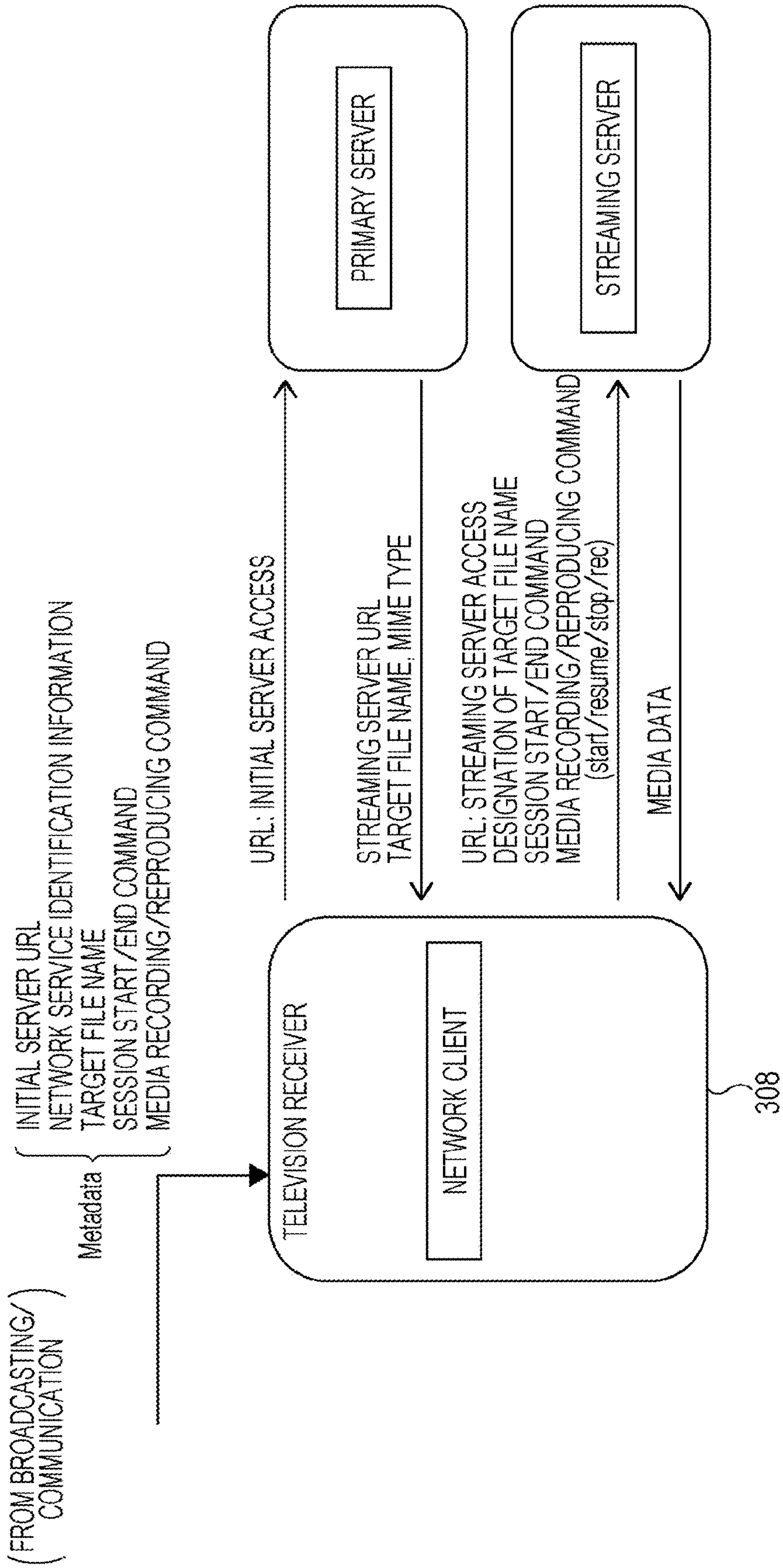
FIG. 30 is a diagram for describing a specific example of a process of using metadata in a television receiver.

In the example of FIG. 30, the primary server and the streaming server are separately arranged. However, the servers may integrally be configured.

Figures 31A, 31B, 31C, 31D, 31E, 31F:
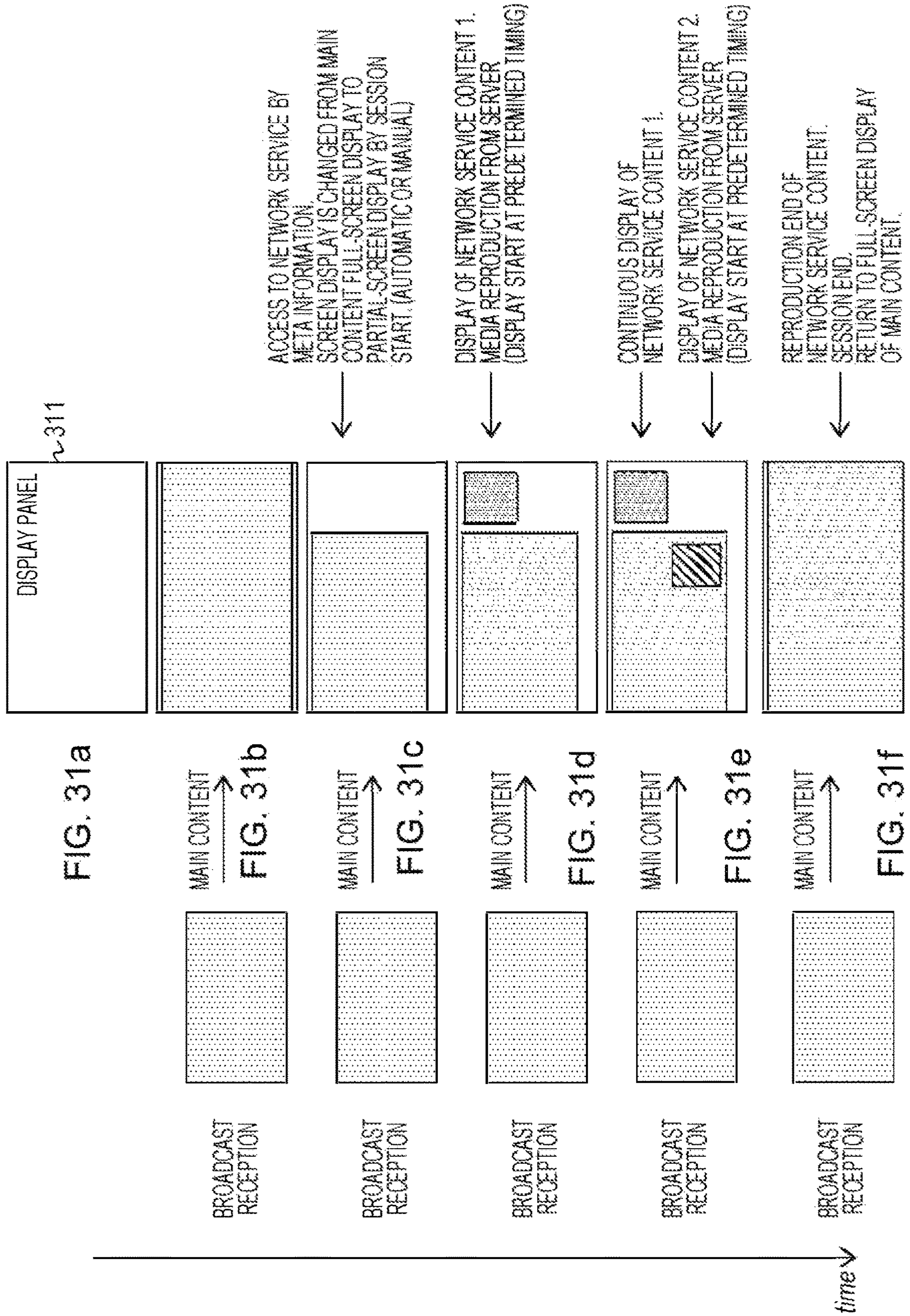
FIGS. 31(*a*) to 31(*f*) are diagrams illustrating a transition example of a screen display when a television receiver accesses a network service based on metadata.

FIGS. 31(*a*) to 31(*f*) illustrate a transition example of a screen display when the television receiver 300 accesses the network service based on the metadata. FIG. 31(*a*) illustrates a state in which no image is displayed on the display panel 311. FIG. 31(*b*) illustrates a state in which broadcast reception starts, and main content related to the broadcast reception is displayed on the display panel 311 in a full-screen display form.

FIG. 31(*c*) illustrates a state in which there is access to the service based on the metadata, and a session starts between the television receiver 300 and the server. In this case, the display of the main content related to the broadcast reception is changed from the full-screen display to the partial-screen display.

FIG. 31(*d*) illustrates a state in which media reproduction from the server is performed, and network service content 1 is displayed on the display panel 311 in parallel with the display of the main content. FIG. 31(*e*) illustrates a state in which media reproduction from the server is performed, and network service content 2 is displayed on the display panel 311 to be superimposed on the display of the main content together with the display of the network service content 1 in parallel with the display of the main content.

FIG. 31(*f*) illustrates a state in which the reproduction of the service content from the network ends, and the session between the television receiver 300 and the server ends. In this case, the display panel 311 returns to the state in which the main content related to the broadcast reception is displayed in the full-screen display form.

Figure 32:
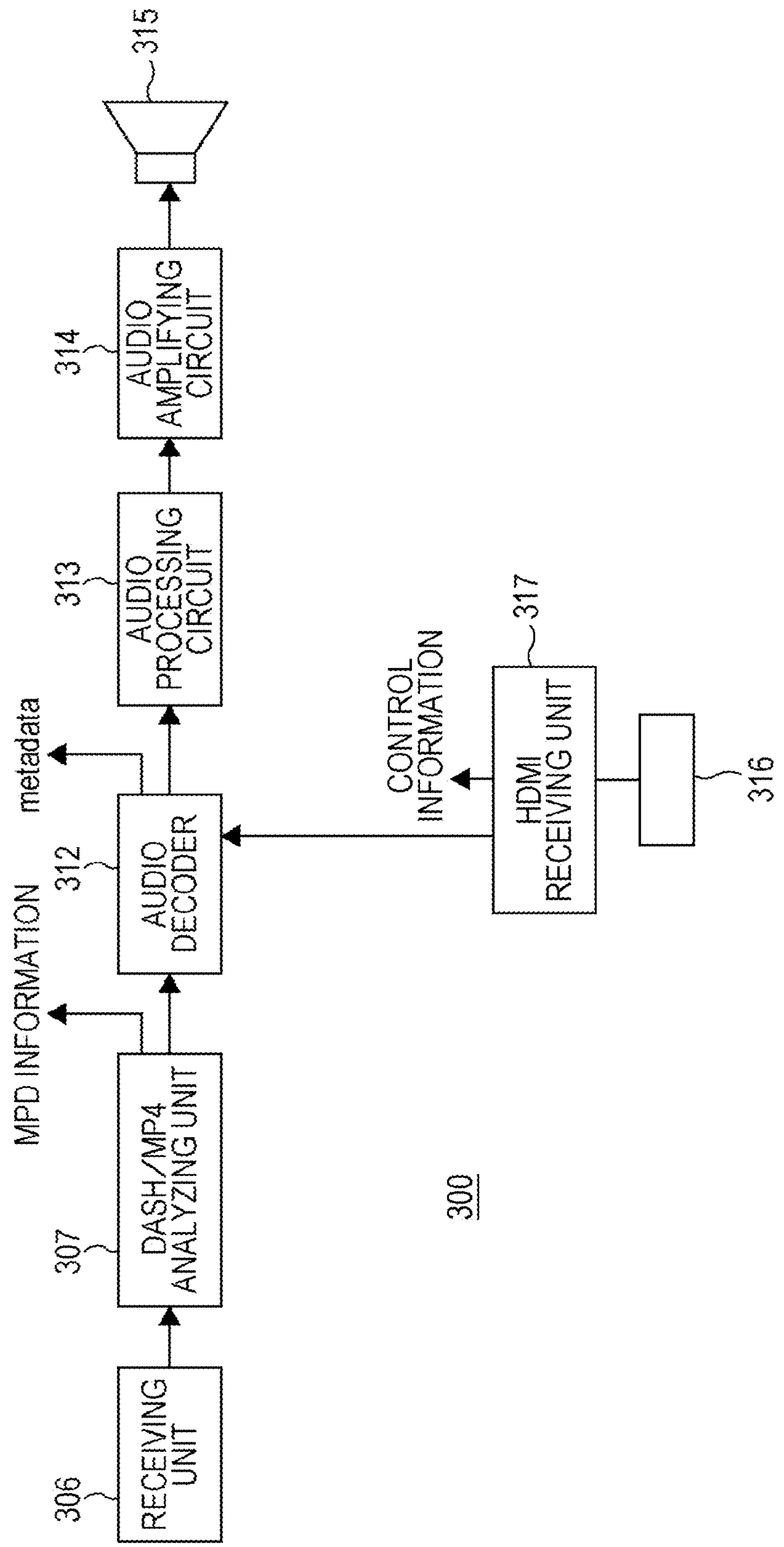
FIG. 32 is a block diagram illustrating a configuration of an audio output system in a television receiver according to an embodiment.

The television receiver 300 illustrated in FIG. 27 includes the speaker 315 and has a configuration in which the audio data obtained by the audio decoder 312 is supplied to the speaker 315 via the audio processing circuit 313 and the audio amplifying circuit 314, and thus the sound is output from the speaker 315 as illustrated in FIG. 32.

Figure 33:
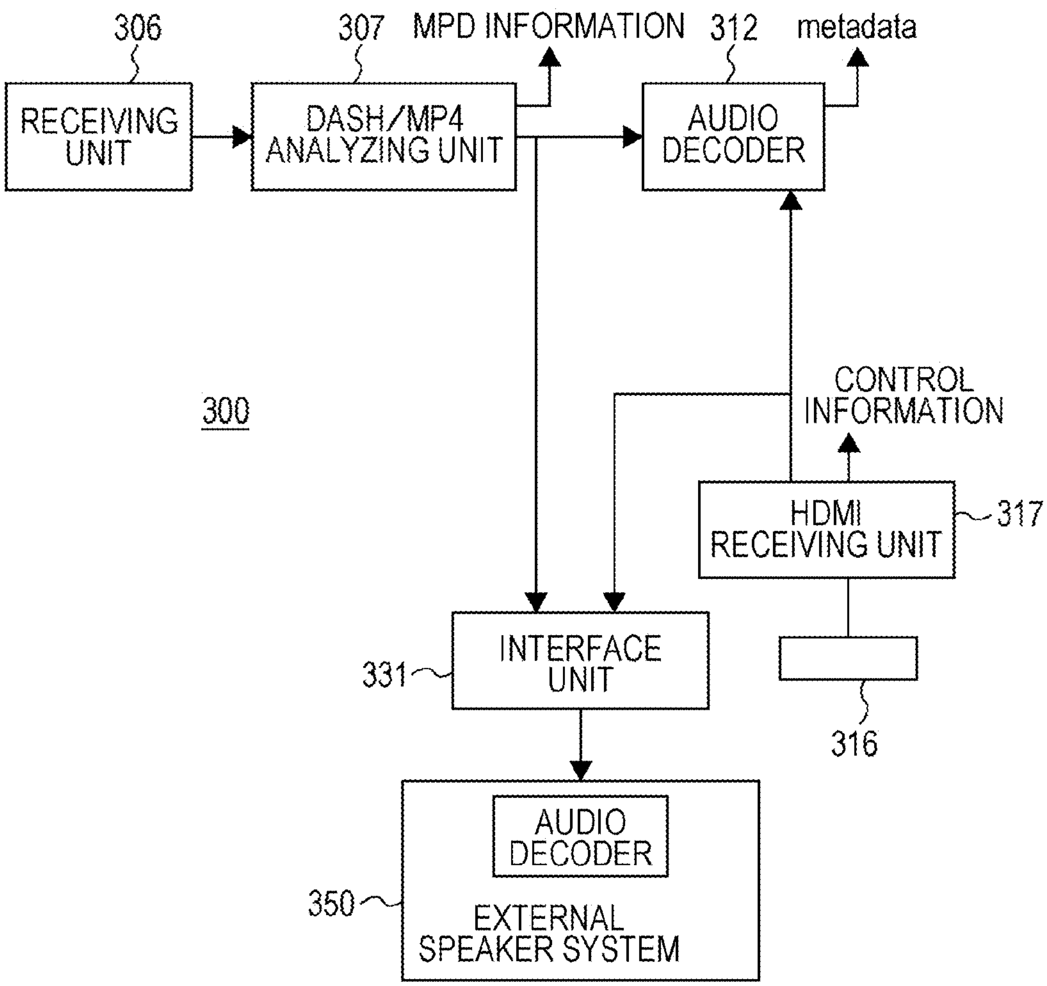
FIG. 33 is a block diagram illustrating another exemplary configuration of an audio output system in a television receiver.

However, as illustrated in FIG. 33, the television receiver 300 may have a configuration in which not speaker is arranged, and the audio stream obtained by the DASH/MP4 analyzing unit 307 or the HDMI receiving unit 317 is supplied from an interface unit 331 to an external speaker system 350. The interface unit 331 is a digital interface such as a HDMI, a Sony Philips digital interface (SPDIF), or a mobile high-definition link (MHL).

In this case, an audio decoder 351*a* arranged in the external speaker system 350 performs the decoding process on the audio stream, and thus the sound is output from the external speaker system 350. Further, even when the television receiver 300 is equipped with the speaker 315 (see FIG. 32), the audio stream may be supplied from the interface unit 331 to the external speaker system 350 (see FIG. 33).

As described above, in the transceiving systems 10 and 10' illustrated in FIGS. 3(*a*) and 3(*b*), the service transmission system 100 inserts the identification information indicating that the metadata is inserted into the audio stream into the MPD file. Thus, the reception side (the set top box 200 and the television receiver 300) can easily recognize that the metadata is inserted into the audio stream.

Further, in the transceiving system 10 illustrated in FIG. 3(*a*), the set top box 200 transmits the audio stream into which the metadata is inserted to the television receiver 300 together with the identification information indicating that the metadata is inserted into the audio stream according to the HDMI. Thus, the television receiver 300 can easily recognize that the metadata is inserted into the audio stream and acquire and use the metadata reliably without waste by performing the process of extracting the metadata inserted into the audio stream based on the recognition.

In the transceiving system 10' illustrated in FIG. 3(*b*), the television receiver 300 extracts the metadata from the audio stream based on the identification information inserted into the MPD file, and uses the metadata for a process. Thus, it is possible to acquire the metadata inserted into the audio stream reliably without waste, and it is possible to perform a process using the metadata appropriately.

2. MODIFIED EXAMPLES

In the embodiment, the transceiving systems 10 and 10' deal with the DASH/MP4, but an example in which an MPEG2-TS is dealt is similarly considered.

[Configuration of Transceiving System]

Figure 34A:
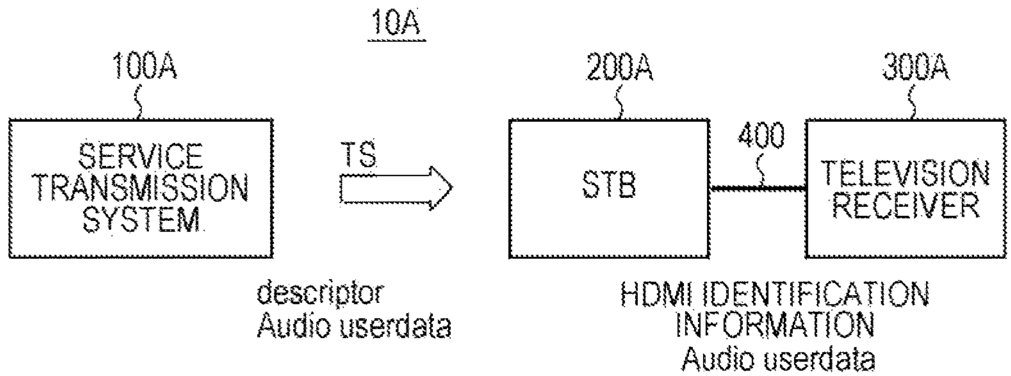
FIGS. 34(*a*) and 34(*b*) are block diagrams illustrating another exemplary configuration of a transceiving system.
Figure 34B:
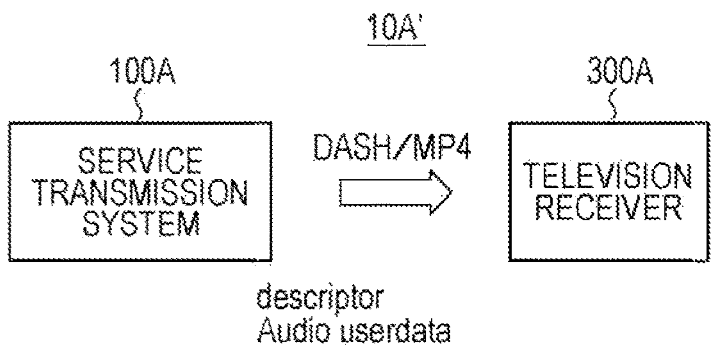

FIGS. 34(*a*) and 34(*b*) illustrate an exemplary configuration of a transceiving system that deals with an MPEG2-TS. The transceiving system 10A of FIG. 34(*a*) includes a service transmission system 100A, a set top box (STB) 200A, and a television receiver (TV) 300A. The set top box 200A is connected with the television receiver 300A via a HDMI cable 400. The transceiving system 10A' of FIG. 3(*b*) includes the service transmission system 100A and the television receiver (TV) 300A.

The service transmission system 100A transmits the transport stream TS of the MPEG2-TS via the RF transmission path or the communication network transmission path. The service transmission system 100A inserts the metadata into the audio stream. For example, access information for a connection to a predetermined network service, predetermined content information, or the like is considered as the metadata. Here, similarly to the above embodiment, the access information for a connection to a predetermined network service is assumed to be inserted.

The service transmission system 100A inserts the identification information indicating that the metadata is inserted into the audio stream into a layer of the container. The service transmission system 100A inserts the identification information into the audio elementary stream loop under control of a program map table (PMT) as a descriptor.

The set top box 200A receives the transport stream TS transmitted from the service transmission system 100A via the RF transmission path or the communication network transmission path. The video stream and the audio stream are included in the transport stream TS, and the metadata is inserted into the audio stream.

The set top box 200A transmits the audio stream to the television receiver 300A via the HDMI cable 400 together with the identification information indicating that the metadata is inserted into the audio stream.

Here, the set top box 200A transmits the audio stream and the identification information to the television receiver 300A by inserting the audio stream and the identification information into the blanking period of time of the image data obtained by decoding the video stream and transmitting the image data to the television receiver 300A. The set top box 200A inserts the identification information, for example, into the audio InfoFrame packet (see FIG. 26).

The television receiver 300A receives the audio stream from the set top box 200A in the transceiving system 10A illustrated in FIG. 34(*a*) via the HDMI cable 400 together with the identification information indicating that the metadata is inserted into the audio stream. In other words, the television receiver 300A receives the image data in which the audio stream and the identification information are inserted into the blanking period of time from the set top box 200A.

Then, the television receiver 300A decodes the audio stream based on the identification information, extracts the metadata, and performs a process using the metadata. In this case, the television receiver 300A accesses a predetermined server on the network based on predetermined network service information serving as the metadata.

Further, the television receiver 300A receives the transport stream TS transmitted from the service transmission system 100A in the transceiving system 10A' illustrated in FIG. 34(*b*) via the RF transmission path or the communication network transmission path. The access information for a connection to a predetermined network service is inserted into the audio stream included in the transport stream TS as the metadata. The identification information indicating that the metadata is inserted into the audio stream is inserted into the layer of the container.

Then, the television receiver 300A decodes the audio stream based on the identification information, extracts the metadata, and performs a process using the metadata. In this case, the television receiver 300A accesses a predetermined server on the network based on predetermined network service information serving as the metadata.

[TS Generating Unit of Service Transmission System]

Figures 35, 36:
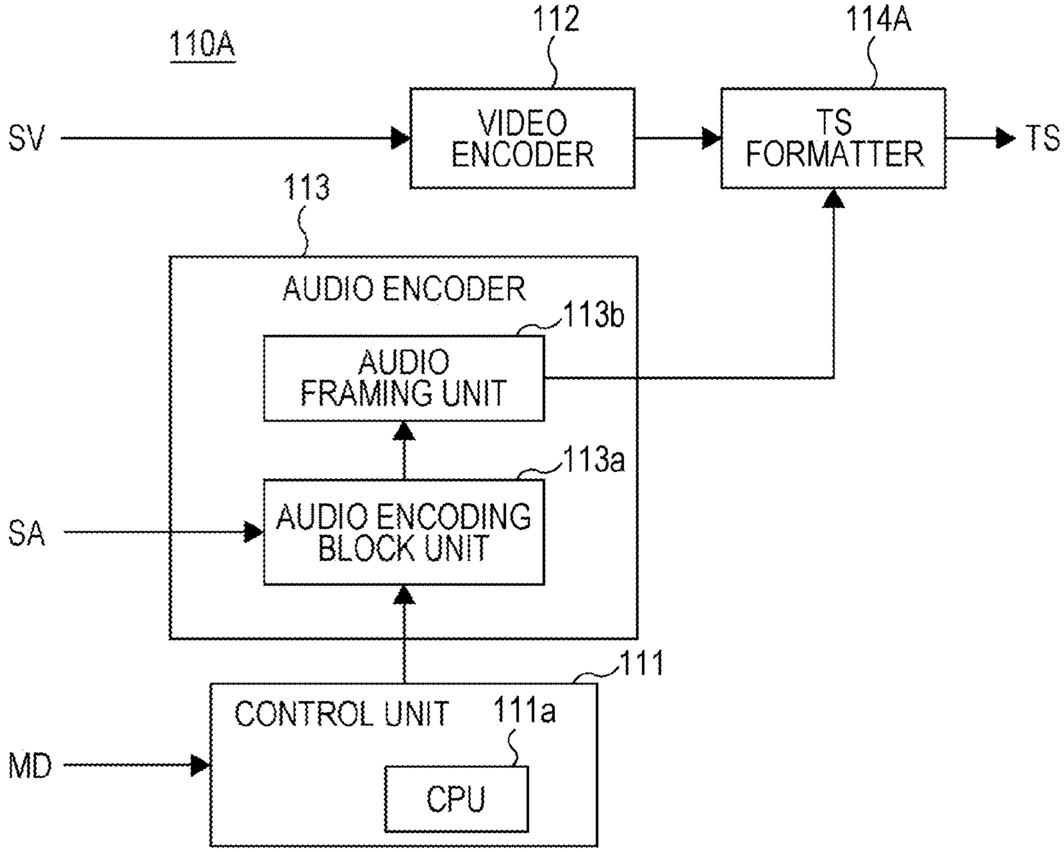
FIG. 35 is a block diagram illustrating an exemplary configuration of a TS generating unit with which a service transmission system is equipped.
FIG. 36 is a diagram illustrating an exemplary structure of an audio user data descriptor.

FIG. 35 illustrates an exemplary configuration of a TS generating unit 110A with which the service transmission system 100A is equipped. In FIG. 35, portions corresponding to those in FIG. 8 are denoted by the same reference numerals. The TS generating unit 110A includes a control unit 111, a video encoder 112, an audio encoder 113, and a TS formatter 114A.

The control unit 111 includes a CPU 111*a*, and controls the respective units of the TS generating unit 110A. The video encoder 112 performs encoding such as MPEG2, H.264/AVC, or H.265/HEVC on image data SV, and generates a video stream (a video elementary stream). Examples of the image data SV include image data reproduced from a recording medium such as a HDD and live image data obtained by a video camera.

The audio encoder 113 performs encoding on the audio data SA according to a compression format such as AAC, AC3, AC4, MPEGH (3D audio), and generates an audio stream (an audio elementary stream). The audio data SA is audio data corresponding to the image data SV, and examples of the audio data SA include audio data reproduced from a recording medium such as a HDD or live audio data obtained by a microphone.

The audio encoder 113 includes an audio encoding block unit 113*a* and an audio framing unit 113*b*. An encoded block is generated through the audio encoding block unit 113*a* and framed through the audio framing unit 113*b*. In this case, an encoded block and framing differ according to a compression format.

The audio encoder 113 inserts metadata MD into the audio stream under control of the control unit 111. For example, access information for a connection to a predetermined network service, predetermined content information, or the like is considered as the metadata MD. Here, similarly to the above embodiment, access information for a connection to a predetermined network service is assumed to be inserted.

The metadata MD is inserted into the user data region of the audio stream. Although a detailed description is omitted, the insertion of the metadata MD in each compression format is performed similarly to the case in the DASH/MP4 generating unit 110 in the above embodiment, and "SDO_payload( )" is inserted as the metadata MD (see FIGS. 8 to 24).

The TS formatter 114A converts the video stream output from the video encoder 112 and the audio stream output from the audio encoder 113, into PES packets, performs conversion into transport packets, performs multiplexing, and obtains the transport stream TS serving as a multiplexed stream.

The TS formatter 114A inserts the identification information indicating that the metadata MD is inserted into the audio stream under control of the PMT. The inserting of the identification information is performed using the audio user data descriptor (audio_userdata_descriptor). This descriptor will be described in detail later.

An operation of the TS generating unit 110A illustrated in FIG. 35 will briefly be described. The image data SV is supplied to the video encoder 112. The video encoder 112 performs encoding such as H.264/AVC or H.265/HEVC on the image data SV, and generates the video stream including encoded video data.

The audio data SA is supplied to the audio encoder 113. The audio encoder 113 performs encoding such as AAC, AC3, AC4, MPEGH (3D audio) on the audio data SA, and generates the audio stream.

At this time, the metadata MD and the size information for embedding the metadata MD in the user data region are supplied from the control unit 111 to the audio encoder 113. Then, the audio encoder 113 embeds the metadata MD in the user data region of the audio stream.

The video stream generated by the video encoder 112 is supplied to the TS formatter 114A. The audio stream including the metadata MD embedded in the user data region, which is generated by the audio encoder 113 is supplied to the TS formatter 114A.

The TS formatter 114A obtains the transport stream TS as transmission data such that the streams supplied from the respective encoders are packetized and multiplied. The TS formatter 114A inserts the identification information indicating that the metadata MD is inserted into the audio stream under control of the PMT.

[Details of Audio User Data Descriptor]

FIG. 36 illustrates an exemplary structure (syntax) of the audio user data descriptor (audio_userdata_descriptor). FIG. 37 illustrates content of main information (semantics) in the exemplary structure.

An 8-bit field of "descriptor_tag" indicates a descriptor type. Here, an 8-bit field of "descriptor_tag" indicates the audio user data descriptor. An 8-bit field of "descriptor_length" indicates a length (size) of a descriptor, and indicates the number of subsequent bytes as a length of a descriptor.

An 8-bit field of "audio_codec_type" indicates an audio encoding scheme (a compression format). For example, "1" indicates "MPEGH," "2" indicates "AAC," "3" indicates "AC3," and "4" indicates "AC4." As this information is added, at the reception side, it is possible to easily detect an encoding scheme of audio data in the audio stream. A 3-bit field of "metadata_type" indicates a type of metadata. For example, "1" indicates that "SDO_payload( )" of ATSC including the access information for a connection to a predetermined network service is arranged in the field of "userdata( )." As this information is added, at the reception side, it is possible to easily detect a type of metadata, that is, what metadata it is and determine whether or not the metadata is acquired, for example.

1-bit flag information of "coordinated_control_flag" indicates whether or not the metadata is inserted into only the audio stream. For example, "1" indicates that the metadata is inserted into a stream of another component as well, and "0" indicates that the metadata is inserted into only the audio stream. As this information is added, at the reception side, it is possible to easily detect whether or not the metadata is inserted into only the audio stream.

A 3-bit field of "frequency_type" indicates a type of insertion frequency of the metadata into the audio stream. For example, "1" indicates that one user data (metadata) is inserted into each audio access unit. "2" indicates that a plurality of pieces of user data (metadata) are inserted into one audio access unit. "3" indicates that at least one user data (metadata) is inserted into a first audio access unit for each group including a random access point. As this information is added, at the reception side, it is possible to easily detect the insertion frequency of the metadata into the audio stream.

[Configuration of Transport Stream TS]

Figure 38:
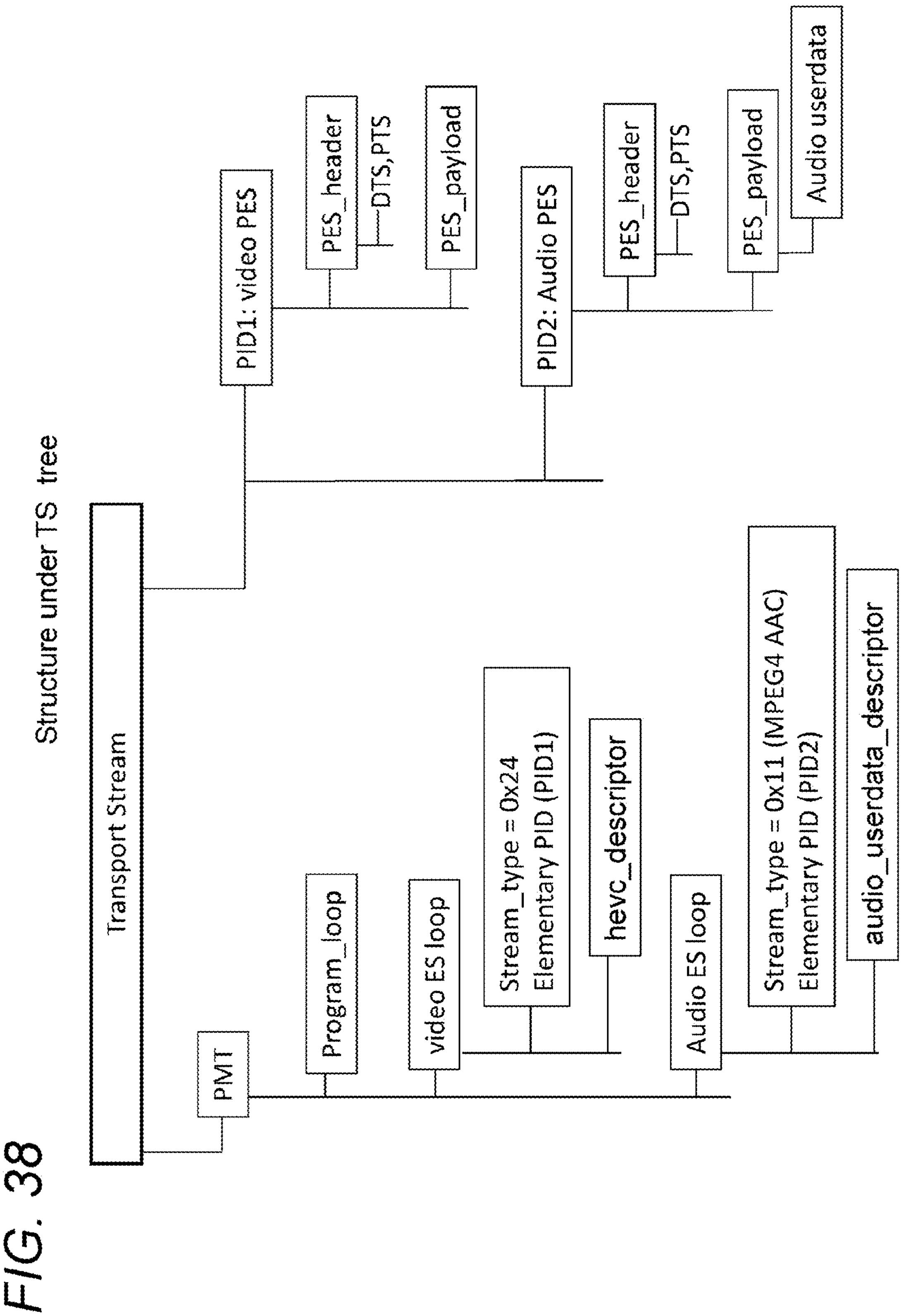
FIG. 38 is a diagram illustrating an exemplary configuration of a transport stream.

FIG. 38 illustrates an exemplary configuration of the transport stream TS. In the exemplary configuration, there is a PES packet "video PES" of a video stream indicated by PID1, and there is a PES packet "audio PES" of an audio stream indicated by PID2. The PES packet is configured with a PES header (PES_header) and a PES payload (PES_payload). Time stamps of a DTS and a PTS are inserted into the PES header. There is the user data region including the metadata in the PES payload of the PES packet of the audio stream.

The transport stream TS includes a PMT as program specific information (PSI). The PSI is information describing a program to which each elementary stream included in the transport stream belongs. The PMT includes a program loop describing information associated with the entire program.

The PMT further includes an elementary stream loop including information associated with each elementary stream. In this exemplary configuration, there is a video elementary stream loop (a video ES loop) corresponding to the video stream, and there is an audio elementary stream loop (an audio ES loop) corresponding to the audio stream.

In the video elementary stream loop (the video ES loop), information such as a stream type and a packet identifier (PID) is arranged in association with the video stream, and a descriptor describing information associated with the video stream is arranged as well. A value of "Stream_type" of the video stream is set to "0x24," and the PID information is regarded to indicate PID1 allocated to the PES packet "video PES" of the video stream as described above. A HEVC descriptor is arranged as one of the descriptors.

In the audio elementary stream loop (the audio ES loop), information such as a stream type and a packet identifier (PID) is arranged in association with the audio stream, and a descriptor describing information associated with the audio stream is arranged as well. A value of "Stream_type" of the audio stream is set to "0x11," and the PID information is regarded to indicate PID2 allocated to the PES packet "audio PES" of the audio stream as described above. The audio user data descriptor (audio_userdata_descriptor) is arranged as one of the descriptors.

[Exemplary Configuration of Set Top Box]

Figure 39:
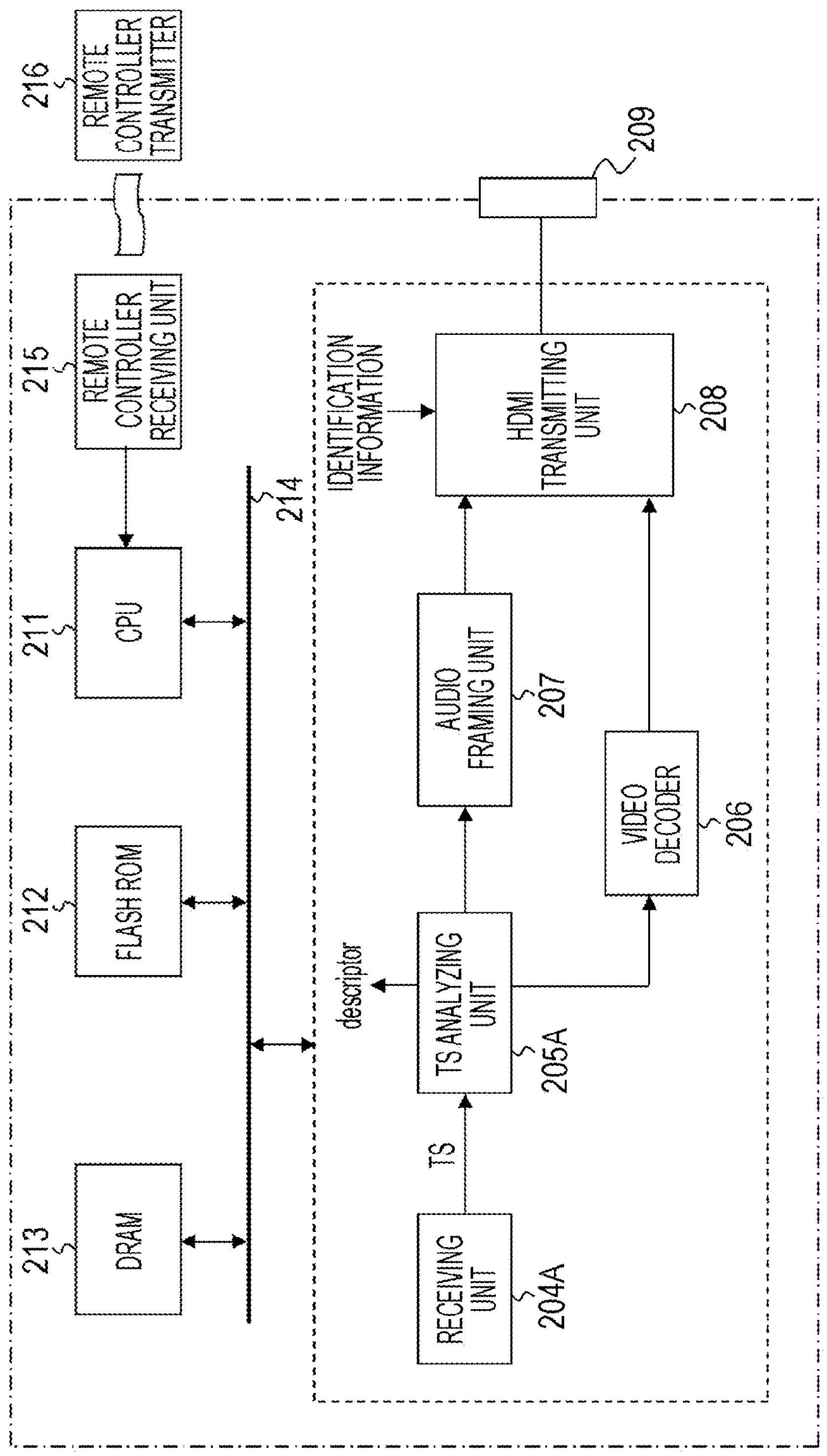
FIG. 39 is a block diagram illustrating an exemplary configuration of a set top box configuring a transceiving system.

FIG. 39 illustrates an exemplary configuration of the set top box 200A. In FIG. 39, portions corresponding to those in FIG. 25 are denoted by the same reference numerals. The receiving unit 204A receives the transport stream TS transmitted from the service transmission system 100A via the RF transmission path or the communication network transmission path.

A TS analyzing unit 205A extracts the packet of the video stream from the transport stream TS, and transfers the packet of the video stream to the video decoder 206. The video decoder 206 reconfigures the video stream from the video packet extracted by the demultiplexer 205, performs a decoding process, and obtains uncompressed image data. The TS analyzing unit 205A extracts the packet of the audio stream from the transport stream TS and reconfigures the audio stream. The audio framing unit 207 performs framing on the audio stream reconfigured as described above.

It is also possible to decode the audio stream through an audio decoder (not illustrated) and perform an audio output in parallel with transmission of the audio stream transferred from the TS analyzing unit 205A to the audio framing unit 207.

Further, the TS analyzing unit 205A extracts various kinds of descriptors and the like from the transport stream TS, and transmits the extracted descriptors and the like to the CPU 211. Here, the descriptor also includes the audio user data descriptor serving as the identification information indicating that the metadata is inserted into the audio stream (see FIG. 36).

Although a detailed description is omitted, the remaining portions of the set top box 200A illustrated in FIG. 39 are configured similarly to the set top box 200 illustrated in FIG. 25 and perform similar operations.

[Exemplary Configuration of Television Receiver]

Figure 40:
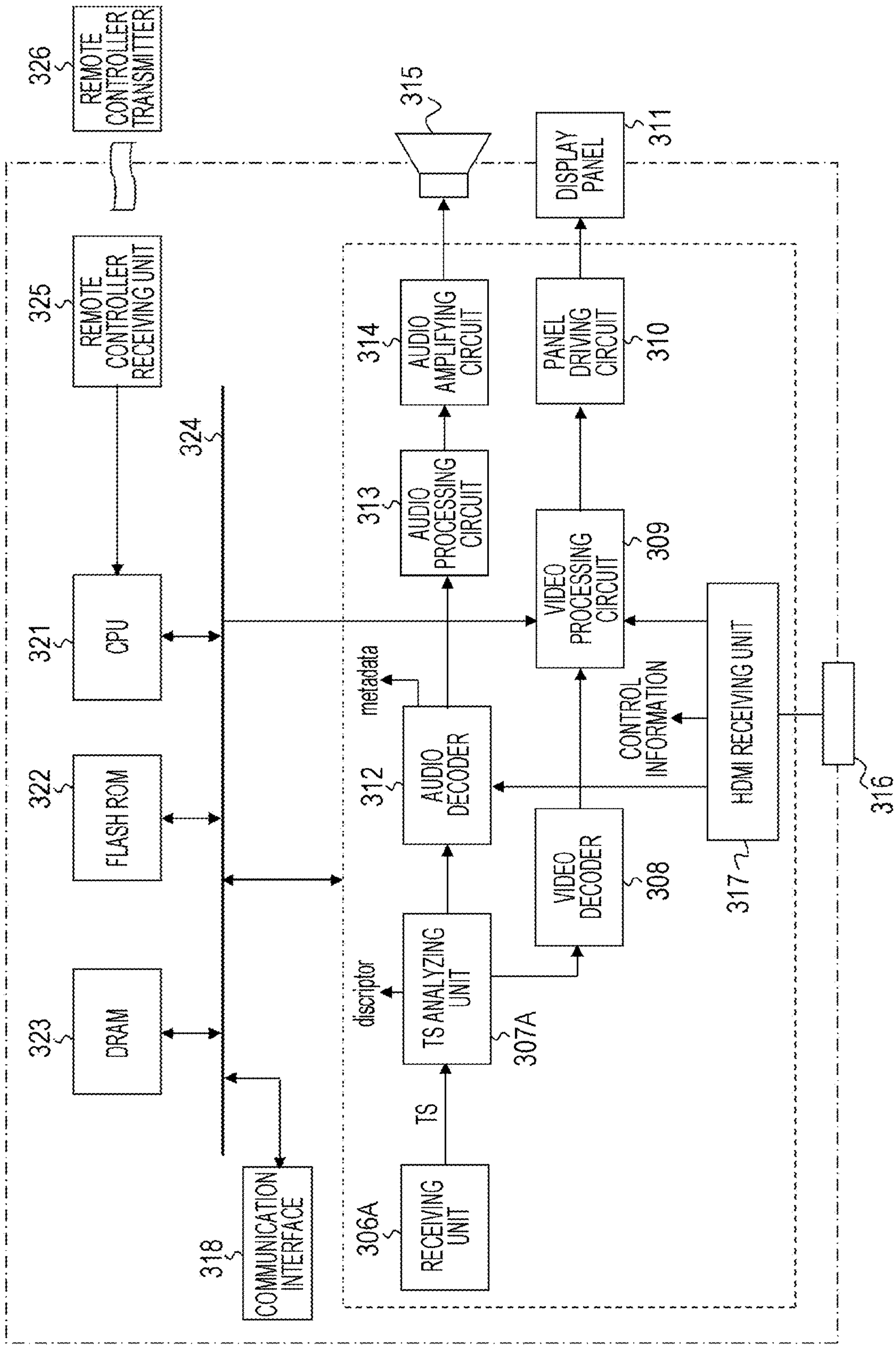
FIG. 40 is a block diagram illustrating an exemplary configuration of a television receiver configuring a transceiving system.

FIG. 40 illustrates an exemplary configuration of the television receiver 300A. In FIG. 40, portions corresponding to those in FIG. 27 are denoted by the same reference numerals. The receiving unit 306A receives the transport stream TS transmitted from the service transmission system 100A via the RF transmission path or the communication network transmission path.

A TS analyzing unit 307A extracts the packet of the video stream from the transport stream TS, and transfers the packet of the video stream to the video decoder 308. The video decoder 308 reconfigures the video stream from the video packet extracted by the demultiplexer 205, performs a decoding process, and obtains uncompressed image data. The TS analyzing unit 307A extracts the packet of the audio stream from the transport stream TS and reconfigures the audio stream.

Further, the TS analyzing unit 307A extracts the packet of the audio stream from the transport stream TS, and reconfigures the audio stream. The TS analyzing unit 307A extracts various kinds of descriptors and the like from the transport stream TS, and transmits the extracted descriptors and the like to the CPU 321. Here, the descriptor also includes the audio user data descriptor serving as the identification information indicating that the metadata is inserted into the audio stream (see FIG. 36).

Although a detailed description is omitted, the remaining portions of the television receiver 300A illustrated in FIG. 40 are configured similarly to the television receiver 300 illustrated in FIG. 27 and perform similar operations.

As described above, in the image display systems 10A and 10A' illustrated in FIGS. 34(*a*) and 34(*b*), the service transmission system 100A inserts the metadata into the audio stream, and inserts the identification information indicating that the metadata is inserted into the audio stream into the layer of the container. Thus, at the reception side (the set top box 200A and the television receiver 300A), it is possible to easily recognize that the metadata is inserted into the audio stream.

In the image display system 10A illustrated in FIG. 34(*a*), the set top box 200A transmits the audio stream into which the metadata is inserted to the television receiver 300A through the HDMI together with the identification information indicating that the metadata is inserted into the audio stream. Thus, the television receiver 300A can easily recognize that the metadata is inserted into the audio stream and can acquire and use the metadata reliably without waste by performing the process of extracting the metadata inserted into the audio stream based on the recognition.

Further, in the image display system 10A' illustrated in FIG. 34(*b*), the television receiver 300A extracts the metadata from the audio stream based on the identification information received together with the audio stream and uses the extracted metadata for a process. Thus, it is possible to acquire the metadata inserted into the audio stream reliably without waste and execute the process using the metadata appropriately.

Further, in the above embodiment, the set top box 200 is configured to transmit the image data and the audio stream to the television receiver 300. However, the image data and the audio stream may be transmitted to a monitor device, a projector, or the like instead of the television receiver 300. Instead of the set top box 200, a recorder with a reception function, a personal computer, or the like may be used.

Further, in the above embodiment, the set top box 200 and the television receiver 300 are connected through the HDMI cable 400. However, even whether the set top box 200 and the television receiver 300 are connected through a digital interface similar to the HDMI in a wired manner or a wireless manner, the invention can similarly be applied.

The present technology may be the following configuration as well.

(1)

A transmission device, including:

a transmitting unit that transmits a metafile including meta information for acquiring an audio stream into which metadata is inserted through a reception device; and an information inserting unit that inserts identification information indicating that the metadata is inserted into the audio stream into the metafile.

(2)

The transmission device according to (1), wherein the metadata is access information for a connection to a predetermined network service.

(3)

The transmission device according to (2), wherein the metadata is a character code indicating URI information.

(4)

The transmission device according to any of (1) to (3), wherein the metafile is an MPD file.

(5)

The transmission device according to (4), wherein the information inserting unit inserts the identification information into the metafile using a "Supplementary Descriptor."

(6)

The transmission device according to any of (1) to (5), wherein the transmitting unit transmits the metafile via an RF transmission path or a communication network transmission path.

(7)

The transmission device according to any of (1) to (6), wherein the transmitting unit further transmits a container of a predetermined format including the audio stream into which the metadata is inserted.

(8)

The transmission device according to (7), wherein the container is an MP4.

(9)

A transmission method, including:

a transmission step of transmitting, by a transmitting unit, a metafile including meta information for acquiring an audio stream into which metadata is inserted through a reception device; and an information insertion step of inserting identification information indicating that the metadata is inserted into the audio stream into the metafile.

(10)

A reception device, including:

a receiving unit that receives a metafile including meta information for acquiring an audio stream into which metadata is inserted, wherein identification information indicating that the metadata is inserted into the audio stream is inserted into the metafile; and a transmitting unit that transmits the audio stream to an external device via a predetermined transmission path together with the identification information indicating that the metadata is inserted into the audio stream.

(11)

The reception device according to (10), wherein the metadata is access information for a connection to a predetermined network service.

(12)

The reception device according to (10) or (11), wherein the metafile is an MPD file, and the identification information is inserted into the metafile using a "Supplementary Descriptor."

(13)

The reception device according to any of (10) to (12), wherein the transmitting unit transmits the audio stream and the identification information to the external device by inserting the audio stream and the identification information into a blanking period of time of image data and transmitting the image data to the external device.

(14)

The reception device according to any of (10) to (13), wherein the predetermined transmission path is a high definition multimedia interface (HDMI) cable.

(15)

A reception method, including:

a reception step of receiving, by a receiving unit, a metafile including meta information for acquiring an audio stream into which metadata is inserted, wherein identification information indicating that the metadata is inserted into the audio stream is inserted into the metafile; and a transmission step of transmitting the audio stream to an external device via a predetermined transmission path together with the identification information indicating that the metadata is inserted into the audio stream.

(16)

A reception device, including:

a receiving unit that receives a metafile including meta information for acquiring an audio stream into which metadata is inserted, wherein identification information indicating that the metadata is inserted into the audio stream is inserted into the metafile;

a metadata extracting unit that decodes the audio stream based on the identification information, and extracts the metadata; and a processing unit that performs a process using the metadata.

(17)

The reception device according to (16), wherein the metafile is an MPD file, and the identification information is inserted into the metafile using a "Supplementary Descriptor."

(18)

The reception device according to (16) or (17), wherein the metadata is access information for a connection to a predetermined network service, and the processing unit accesses the predetermined server on a network based on the network access information.

(19)

A reception method, including:

a reception step of receiving, by a receiving unit, a metafile including meta information for acquiring an audio stream into which metadata is inserted, wherein identification information indicating that the metadata is inserted into the audio stream is inserted into the metafile;

a metadata extraction step of decoding the audio stream based on the identification information and extracting the metadata; and a processing step of performing a process using the metadata.

(20)

A transmission device, including:

a stream generating unit that generates an audio stream into which metadata including network access information is inserted; and a transmitting unit that transmits a container of a predetermined format including the audio stream.

One of the main features of the present technology lies in that when the metadata is inserted into the audio stream by delivery of the DASH/MP4, the identification information indicating that the metadata is inserted into the audio stream is inserted into the MPD file, and thus, at the reception side, it is possible to easily recognize that the metadata is inserted into the audio stream (see FIGS. 3 and 4).

REFERENCE SIGNS LIST

10, 10', 10A, 10A' Transceiving system
14 Effective pixel period
15 Horizontal blanking period of time
16 Vertical blanking period of time
17 Video data period
18 Data island period
19 Control period
30A, 30B MPEG-DASH-based stream delivery system
31 DASH stream file server
32 DASH MPD server
33, 33-1 to 33-N Reception system
34 CDN
35, 35-1 to 35-M Reception system
36 Broadcast transmission system
81 HDMI transmitter
82 HDMI receiver
83 DDC
84 CEC line
85 EDID ROM
100, 100A Service transmission system
110 DASH/MP4 generating unit
110A TS generating unit
111 Control unit
111*a* CPU
112 Video encoder
113 Audio encoder
113*a* Audio encoding block unit
113*b* Audio framing unit
114 DASH/MP4 formatter
114A TS formatter
200, 200A Set top box (STB)
204, 204A Receiving unit
205 DASH/MP4 analyzing unit
205A TS analyzing unit
206 Video decoder
207 Audio framing unit
208 HDMI transmitting unit
209 HDMI terminal
211 CPU 211
212 Flash ROM
213 DRAM
214 Internal bus
215 Remote controller receiving unit
216 Remote controller transmitter
300, 300A Television receiver
306, 306A Receiving unit
307 DASH/MP4 analyzing unit
307A TS analyzing unit
308 Video decoder
309 Video processing circuit
310 Panel driving circuit
311 Display panel
312 Audio decoder
313 Audio processing circuit
314 Audio amplifying circuit
315 Speaker
316 HDMI terminal
317 HDMI receiving unit
318 Communication interface
321 CPU
322 Flash ROM
323 DRAM
324 Internal bus
325 Remote controller receiving unit
326 Remote controller transmitter
350 External speaker system
400 HDMI cable

The invention claimed is:

1. An information processing apparatus, comprising:
a reception circuit that receives an audio stream;
a decoding circuit that performs decoding processing on the audio stream and obtains audio data; and
an audio processing circuit that processes the audio data and outputs the audio data to an output circuit, wherein
a codec of the audio stream is MPEG-H 3D audio,
the audio stream includes a header and a payload,
the payload includes "SYNC" corresponding to a synchronization start code, "Frame" that is actual data of 3D audio transmission data, and "Config" indicating a configuration of the "Frame",
the "Frame" includes channel coded data or object coded data constituting the 3D audio transmission data,
the object coded data includes encoded sample data of a single channel element (SCE) and metadata for mapping the encoded sample data to a speaker existing at an arbitrary position and for rendering the encoded sample data, and
the metadata is included as an extension element (Ext_element).

2. The information processing apparatus according to claim 1, wherein a type (ExElementType) of the extension element corresponding to a case where a value of the extension element (Ext_element) is 0 is ID_EXT_ELE_FILL.

3. The information processing apparatus according to claim 1, wherein a type (ExElementType) of the extension element corresponding to a case where the value of the extension element (Ext_element) is 1 is ID_EXT_ELE_MPEGS.

4. The information processing apparatus according to claim 1, wherein a type (ExElementType) of the extension element corresponding to a case where the value of the extension element (Ext_element) is 2 is ID_EXT_ELE_SAOC.

5. The information processing apparatus according to claim 1, wherein a type (ExElementType) of the extension element corresponding to a case where the value of the extension element (Ext_element) is 3 is ID_EXT_ELE_AUDIOPREROLL.

6. The information processing apparatus according to claim 1, wherein a type (ExElementType) of the extension element corresponding to a case where the value of the extension element (Ext_element) is 4 is ID_EXT_ELE_UNI_DRC.

7. The information processing apparatus according to claim 1, wherein a type (ExElementType) of the extension element corresponding to a case where the value of the extension element (Ext_element) is 5 is ID_EXT_ELE_OBJ_METADATA.

8. The information processing apparatus according to claim 1, wherein a type (ExElementType) of the extension element corresponding to a case where the value of the extension element (Ext_element) is 6 is ID_EXT_ELE_SAOC_3D.

9. The information processing apparatus according to claim 1, wherein a type (ExElementType) of the extension element corresponding to a case where the value of the extension element (Ext_element) is 7 is ID_EXT_ELE_HOA.

10. The information processing apparatus according to claim 1, wherein when a value of the extension element (Ext_element) is 128 or more, extension to other than MPEG is allowed.

11. The information processing apparatus according to claim 1, wherein the audio stream includes a plurality of MPEG audio stream packets.

12. The information processing apparatus according to claim 1, wherein the header includes information of a packet type, a packet label, and a packet length.

13. The information processing apparatus according to claim 1, wherein the audio stream is included in a transport stream of MPEG2-TS.

14. The information processing apparatus according to claim 1, wherein the audio stream further includes identification information indicating that the audio stream includes the metadata.

15. An information processing method, comprising:

receiving an audio stream;

performing decoding processing on the audio stream and obtaining audio data; and processing the audio data and outputting the audio data to an output device, wherein a codec of the audio stream is MPEG-H 3D audio, the audio stream includes a header and a payload, the payload includes "SYNC" corresponding to a synchronization start code, "Frame" that is actual data of 3D audio transmission data, and "Config" indicating a configuration of the "Frame", the "Frame" includes channel coded data or object coded data constituting the 3D audio transmission data, the object coded data includes encoded sample data of a single channel element (SCE) and metadata for mapping the encoded sample data to a speaker existing at an arbitrary position and for rendering the encoded sample data, and the metadata is included as an extension element (Ext_element).

16. A non-transitory computer-readable medium storing a program that causes a computer to execute an information processing method comprising:

receiving an audio stream;

performing decoding processing on the audio stream and obtaining audio data; and processing the audio data and outputting the audio data to an output device, wherein a codec of the audio stream is MPEG-H 3D audio, the audio stream includes a header and a payload, the payload includes "SYNC" corresponding to a synchronization start code, "Frame" that is actual data of 3D audio transmission data, and "Config" indicating a configuration of the "Frame", the "Frame" includes channel coded data or object coded data constituting the 3D audio transmission data, the object coded data includes encoded sample data of a single channel element (SCE) and metadata for mapping the encoded sample data to a speaker existing at an arbitrary position and for rendering the encoded sample data, and the metadata is included as an extension element (Ext_element).

* * * * *